US010035869B2

(12) United States Patent
Harada et al.

(10) Patent No.: US 10,035,869 B2
(45) Date of Patent: Jul. 31, 2018

(54) COPOLYMER, AQUEOUS INK, AND INK CARTRIDGE

(71) Applicants: Shigeyuki Harada, Shizuoka (JP); Yoshiki Yanagawa, Shizuoka (JP); Keita Katoh, Kanagawa (JP); Masayuki Fukuoka, Shizuoka (JP); Kazukiyo Nagai, Shizuoka (JP); Yuusuke Koizuka, Shizuoka (JP); Tomoyuki Shimada, Shizuoka (JP); Akiyoshi Sabu, Shizuoka (JP)

(72) Inventors: Shigeyuki Harada, Shizuoka (JP); Yoshiki Yanagawa, Shizuoka (JP); Keita Katoh, Kanagawa (JP); Masayuki Fukuoka, Shizuoka (JP); Kazukiyo Nagai, Shizuoka (JP); Yuusuke Koizuka, Shizuoka (JP); Tomoyuki Shimada, Shizuoka (JP); Akiyoshi Sabu, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/547,668

(22) PCT Filed: Jan. 28, 2016

(86) PCT No.: PCT/JP2016/000454
§ 371 (c)(1),
(2) Date: Jul. 31, 2017

(87) PCT Pub. No.: WO2016/125473
PCT Pub. Date: Aug. 11, 2016

(65) Prior Publication Data
US 2018/0002469 A1 Jan. 4, 2018

(30) Foreign Application Priority Data

Feb. 2, 2015 (JP) ................................ 2015-018161
Sep. 11, 2015 (JP) ................................ 2015-179957

(51) Int. Cl.
B41J 2/04 (2006.01)
C09D 11/106 (2014.01)
(Continued)

(52) U.S. Cl.
CPC ............... $C08F\ 220/36$ (2013.01); $B41J\ 2/04$ (2013.01); $C09D\ 11/106$ (2013.01);
(Continued)

(58) Field of Classification Search
CPC ........ B41J 2/04; C09D 11/106; C09D 11/322; C09D 11/326; C09D 11/30; C09D 11/107;
(Continued)

(56) References Cited

U.S. PATENT DOCUMENTS 7,946,698 B2 * 5/2011 Makuta .................. B41J 11/002
347/101
8,147,921 B2 * 4/2012 Umebayashi ........ C09D 11/101
347/100
(Continued)

FOREIGN PATENT DOCUMENTS

EP 2754679 A1 7/2014
JP 04-080212 3/1992
(Continued)

OTHER PUBLICATIONS

International Search Report and Written Opinion dated Apr. 5. 2016 in PCT/JP2016/000454 filed Jan. 28, 2016.

Primary Examiner — Anh T. N. Vo
(74) Attorney, Agent, or Firm — Oblon, McClelland, Maier & Neustadt, L.L.P.

(57) ABSTRACT

To provide a copolymer including: a structural unit represented by the following General Formula (1) where X represents a hydrogen atom or a cation; a structural unit (Continued)

expressed by the following Structural Formula (1); and a structural unit represented by the following General Formula (2) where R is a hydrogen atom or a methyl group, L is a single bond or $-(CH_2)_n-O-CO-$ where n is an integer in a range of from 2 through 18, and a carbonyl carbon atom in the $-(CH_2)_n-O-CO-$ is bound to naphthyl.

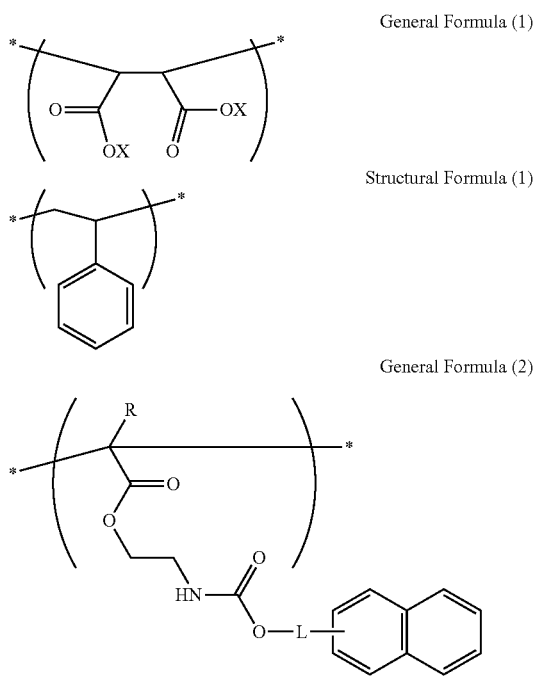

General Formula (1)

Structural Formula (1)

General Formula (2)

10 Claims, 4 Drawing Sheets

(51) Int. Cl.
| | |
|---|---|
| *C09D 11/322* | (2014.01) |
| *C09D 11/30* | (2014.01) |
| *C09D 11/107* | (2014.01) |
| *C08F 220/36* | (2006.01) |
| *C09D 11/326* | (2014.01) |
| *C08F 212/08* | (2006.01) |

(52) U.S. Cl.
CPC ............ *C09D 11/107* (2013.01); *C09D 11/30* (2013.01); *C09D 11/322* (2013.01); *C09D 11/326* (2013.01); *C08F 212/08* (2013.01); *C08F 2220/365* (2013.01)

(58) Field of Classification Search
CPC .... C08F 220/36; C08F 212/08; C08F 222/02; C08F 2220/365
See application file for complete search history.

(56) References Cited

U.S. PATENT DOCUMENTS

| | | | |
|---|---|---|---|
| 8,960,885 | B2 | 2/2015 | Katoh et al. |
| 8,974,895 | B2 | 3/2015 | Naruse et al. |
| 8,998,400 | B2 | 4/2015 | Harada et al. |
| 2005/0206703 | A1 | 9/2005 | Guo et al. |
| 2007/0100023 | A1 | 5/2007 | Burns et al. |
| 2007/0100024 | A1 | 5/2007 | Gu et al. |
| 2014/0055520 | A1 | 2/2014 | Inumaru et al. |
| 2014/0072779 | A1 | 3/2014 | Matsuyama et al. |
| 2014/0120331 | A1 | 5/2014 | Koizuka et al. |
| 2014/0141209 | A1 | 5/2014 | Koizuka et al. |
| 2014/0198160 | A1 | 7/2014 | Harada et al. |
| 2015/0056425 | A1 | 2/2015 | Nagai et al. |
| 2015/0064418 | A1 | 3/2015 | Matsuyama et al. |
| 2015/0064425 | A1 | 3/2015 | Matsuyama et al. |
| 2015/0109382 | A1 | 4/2015 | Naruse et al. |
| 2015/0116421 | A1 | 4/2015 | Nonogaki et al. |
| 2015/0125672 | A1 | 5/2015 | Katoh et al. |
| 2015/0247049 | A1 | 9/2015 | Matsuyama et al. |
| 2015/0252203 | A1 | 9/2015 | Matsuyama et al. |
| 2015/0259555 | A1 | 9/2015 | Katoh et al. |
| 2015/0291817 | A1 | 10/2015 | Katoh et al. |
| 2015/0307734 | A1 | 10/2015 | Nonogaki et al. |
| 2016/0017075 | A1 | 1/2016 | Harada et al. |
| 2016/0297984 | A1 | 10/2016 | Kitanohara et al. |

FOREIGN PATENT DOCUMENTS

| | | |
|---|---|---|
| JP | 2867491 | 3/1999 |
| JP | 3256568 | 2/2002 |
| JP | 2008-536963 | 9/2008 |
| JP | 2008-285468 | 11/2008 |
| JP | 4687110 | 5/2011 |
| JP | 2011-105866 | 6/2011 |
| JP | 4722462 | 7/2011 |
| JP | 2012-052027 | 3/2012 |
| JP | 4956666 | 6/2012 |
| JP | 2012-158740 | 8/2012 |
| JP | 5001291 | 8/2012 |
| JP | 2013-159687 | 8/2013 |
| JP | 2015-040234 | 3/2015 |
| JP | 2016-196621 | 11/2016 |
| WO | WO2015/076314 A1 | 5/2015 |

* cited by examiner

[Fig. 1]
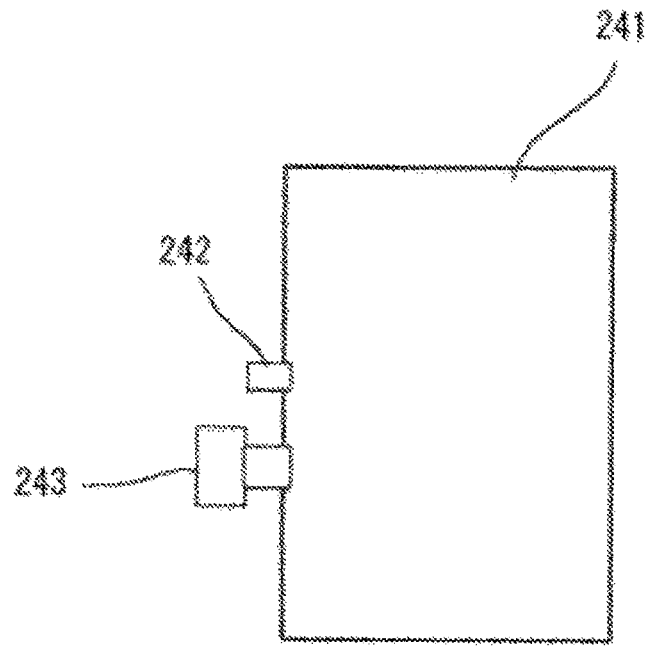
[Fig. 2]
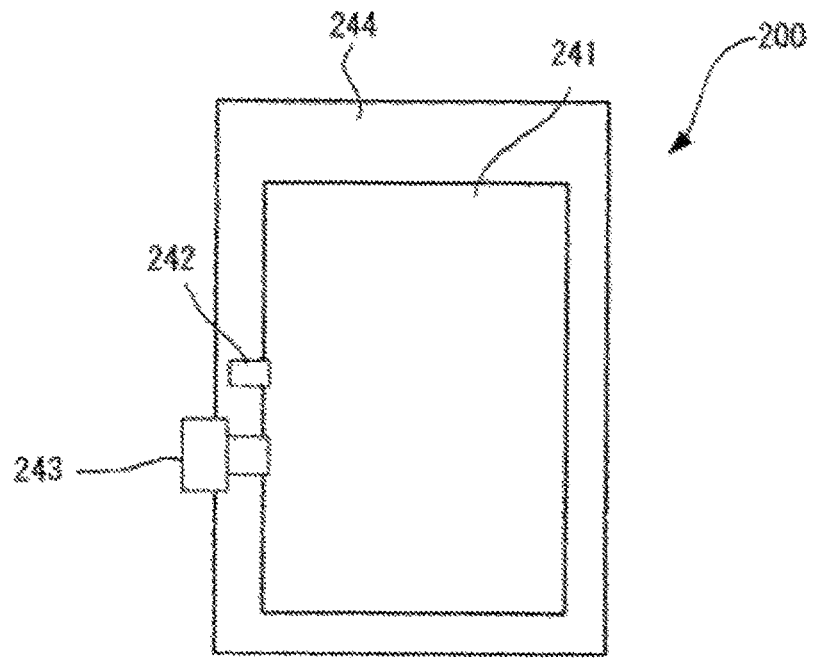

[Fig. 3]
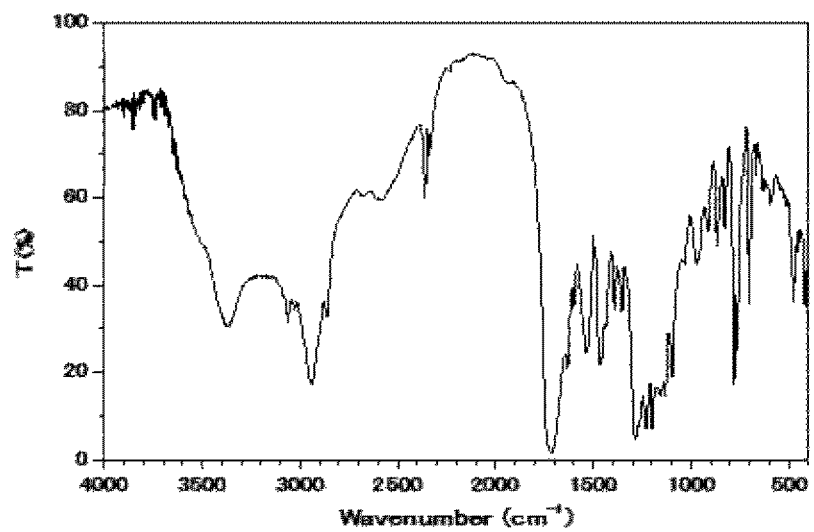
[Fig. 4]
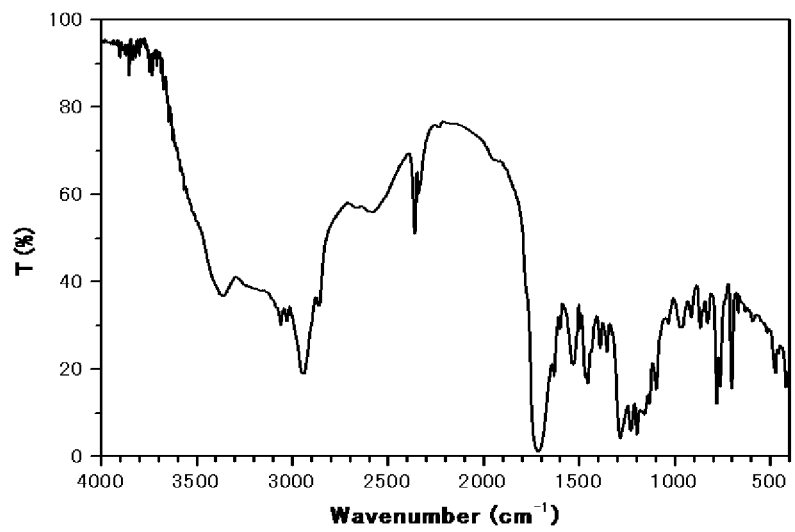

[Fig. 5]
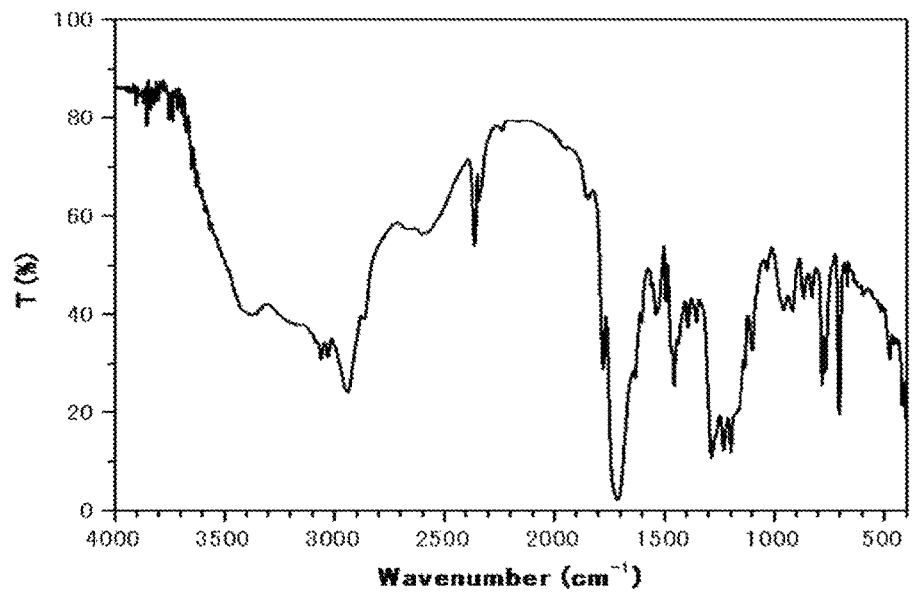
[Fig. 6]
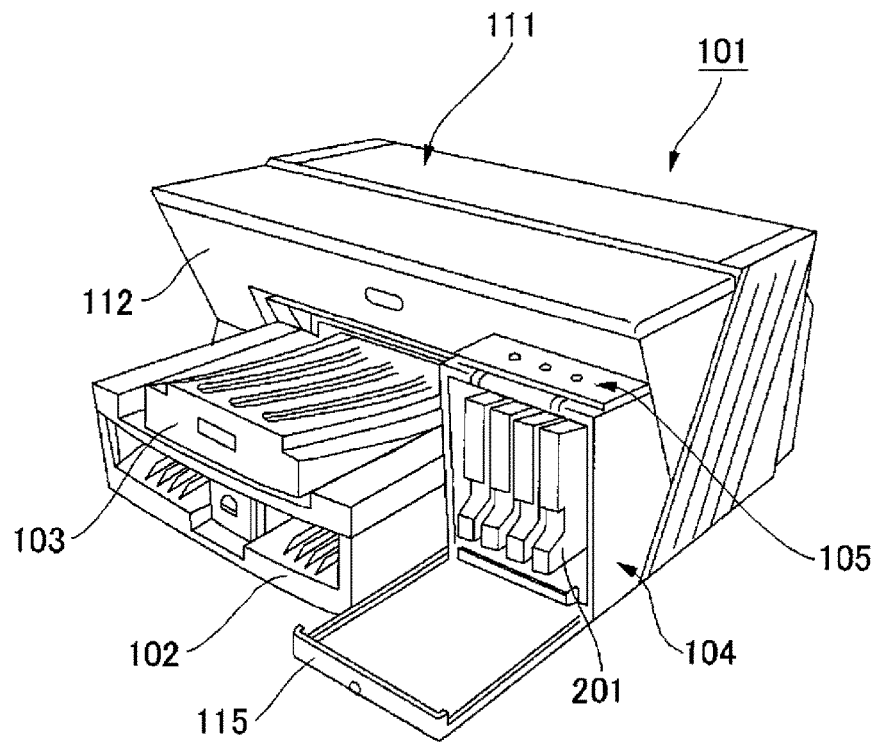

[Fig. 7]
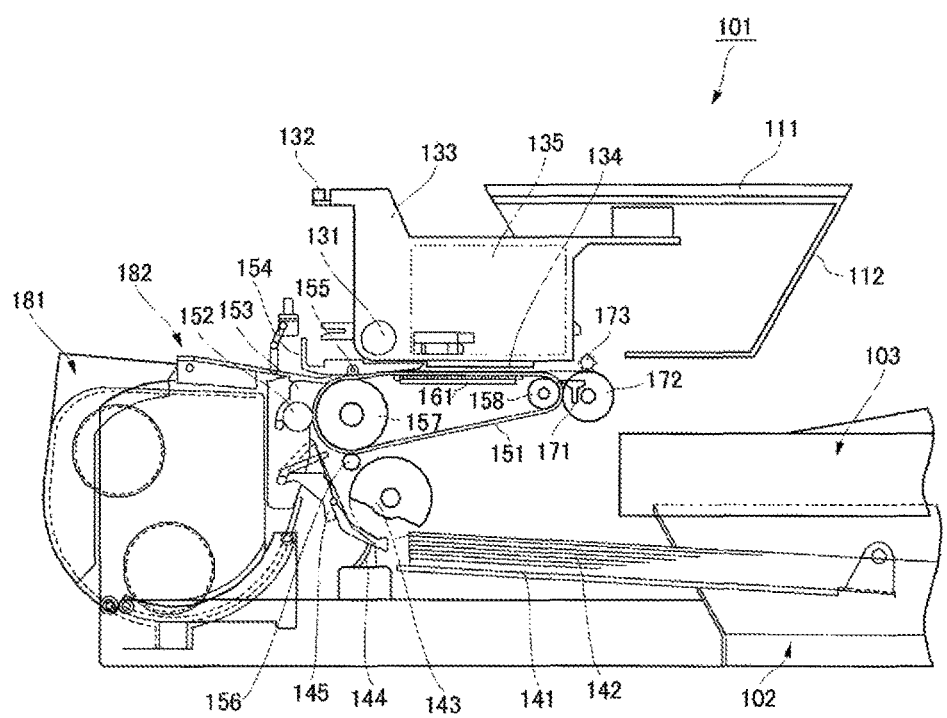

COPOLYMER, AQUEOUS INK, AND INK CARTRIDGE

TECHNICAL FIELD

The present disclosure relates to novel copolymers, aqueous inks, and ink cartridges.

BACKGROUND ART

Ink jet recording methods have become popular because compared to other recording methods, the ink jet recording methods are advantageous in that they proceed with processes with ease and form full color images in a more simple manner, and that images having high resolution can be obtained with devices having simple configurations. Therefore, the ink recording methods have found applications not only in personal use but also in uses in offices, commercial printings, and industrial printings. In these ink jet recording methods, an aqueous ink composition containing an aqueous dye as a colorant is mainly used, but it is poor in water resistance and light resistance. Therefore, a pigment ink containing a water-insoluble pigment has been developed instead of the aqueous dye.

In the inkjet printing used for offices, plain paper is mainly used as a recording medium, and there is a need for attainment of high image density. In general, when a pigment ink is printed on plain paper, the pigment does not remain on the surface of the paper, and penetrates into the paper. Therefore, a concentration of the pigment on the surface of the paper is low, which leads to reduction in image density. When the concentration of the pigment in the ink is high, high image density can be obtained, but a viscosity of the ink becomes high, which leads to reduction in ejection stability.

In order to solve the above problems, various methods for allowing a pigment to remain on the surface of paper have been proposed. For example, there is proposed an inkjet ink containing a liquid vehicle, a colorant, and a polymer, where the polymer has at least one functional group and has a predetermined calcium index value. (see PTL 1). This proposal describes 4-methacrylamide-1-hydroxy butane-1,1-diphosphonic acid as a monomer constituting the polymer. However, this proposal has a problem that storage stability of the ink is low.

Moreover, there is proposed an inkjet recording method where a reception liquid containing a calcium salt is allowed to adhere to paper, to print an image using an ink containing a resin emulsion, a surfactant, a pigment containing a phosphate-containing group (see PTL 2). In this proposal, however, when the ink is printed on plain paper, an effect of improving image density is not sufficiently obtained.

Moreover, similar to the ink jet recording method, there is a problem that an aqueous pigment ink containing a pigment as a colorant is poor in color density on plain paper, particularly white plain paper compared to a dye ink in cases where the aqueous pigment ink is used for writing tools such as felt-tipped markers, ballpoint pens, and plotter pens. In order to solve the above problems, there is proposed an aqueous pigment ink containing urea or derivatives thereof, water, a pigment, an aqueous resin, phosphoric acid ester surfactant, and an O/W type emulsion of copolymer of water-insoluble (meth) acrylic resin and/or stylene-(meth) acrylic acid, which has an average particle diameter in a range of from 50 nm through 200 nm and has a minimum filming forming temperature of 50 degrees Celsius or more (see PTL 3). In this proposal, however, an effect of improving color density is not sufficiently obtained.

In an aqueous pigment ink used for the ink jet recording method and writing tools, it is necessary to stably dissolve a pigment of the aqueous pigment ink in water for a long term, compared to an aqueous dye ink prepared by dissolving a dye in water. Therefore, various pigment dispersing agents have been developed.

For example, as a pigment dispersing agent, a graft polymer containing an aromatic ring at a side chain of the polymer is proposed (see PTL 4).

However, this proposal is insufficient in terms of long-term storage stability. In the ink jet recording method, a hydrophilic organic solvent may be added to the aqueous ink, in order to prevent plain paper from causing curl generated during printing on the plain paper, or in order to improve permeability of the ink to be quickly dried, and to prevent occurrence of beading in cases where the ink is printed on coated paper or art paper. However, when the aforementioned method is applied to the graft polymer described in the PTL 4, pigment dispersiveness is deteriorated and long-term storage stability cannot be secured.

CITATION LIST

Patent Literature

PTL 1: Japanese Patent No. 5001291
PTL 2: Japanese Patent No. 4956666
PTL 3: Japanese Patent No. 4722462
PTL 4: Japanese Unexamined Patent Application Publication No. 2011-105866

SUMMARY OF INVENTION

Technical Problem

The present invention has an object to provide a novel copolymer that is useful for a binder resin and a pigment dispersing agent of an aqueous ink.

Solution to Problem

As means for solving the above problems, a copolymer of the present invention includes a structural unit represented by the following General Formula (1), a structural unit expressed by the following Structural Formula (1), and a structural unit represented by the following General Formula (2).

(Chem. 1)

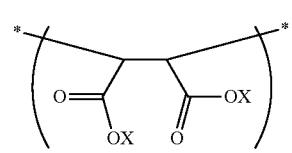

General Formula (1)

Here, in the General Formula (1), X represents a hydrogen atom or a cation.

(Chem. 2)

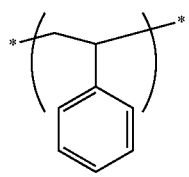

Structural Formula (1)

(Chem. 3)

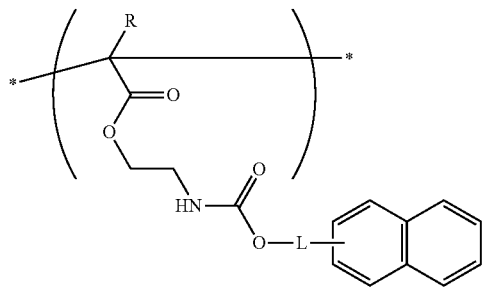

General Formula (2)

Here, in the General Formula (2), R is a hydrogen atom or a methyl group, L is a single bond or —$(CH_2)_n$—O—CO— where n is an integer in a range of from 2 through 18, and a carbonyl carbon atom in the —$(CH_2)_n$—O—CO— is bound to naphthyl.

Advantageous Effects of Invention

According to the present invention, a novel copolymer that is useful for a binder resin and a pigment dispersing agent of an aqueous ink can be provided.

BRIEF DESCRIPTION OF DRAWINGS

FIG. 1 is a view illustrating one example of an ink cartridge of the present invention.
FIG. 2 is an explanation view illustrating the ink cartridge illustrated in FIG. 1 and a casing of the ink cartridge.
FIG. 3 is a graph illustrating an IR spectrum of the copolymer obtained in Example 1.
FIG. 4 is a graph illustrating an IR spectrum of the copolymer obtained in Example 6.
FIG. 5 is a graph illustrating an IR spectrum of the copolymer obtained in Example 9.
FIG. 6 is a schematic view illustrating one example of an inkjet recording device of the present invention.
FIG. 7 is a schematic view illustrating one example of configuration of a main body of the device illustrated in FIG. 6.

DESCRIPTION OF EMBODIMENTS

Copolymer

A copolymer of the present invention contains a structural unit represented by the following General Formula (1), a structural unit expressed by the following Structural Formula (1), and a structural unit represented by the following General Formula (2); and further contains a structural unit derived from another polymerizable monomer, if necessary.

(Chem. 4)

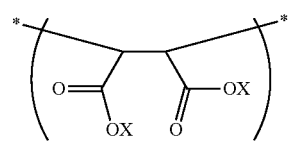

General Formula (1)

Here, in the General Formula (1), X represents a hydrogen atom or a cation.

(Chem. 5)

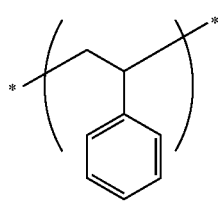

Structural Formula (1)

(Chem. 6)

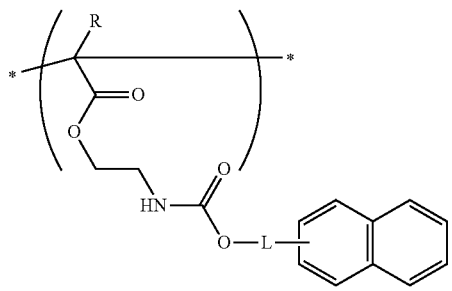

General Formula (2)

Here, in the General Formula (2), R is a hydrogen atom or a methyl group, and L is a single bond or —$(CH_2)_n$—O—CO— where n is an integer in a range of from 2 through 18, and a carbonyl carbon atom in the —$(CH_2)_n$—O—CO— is bound to naphthyl.

When a copolymer of the present invention is used as a binder resin of an aqueous ink, an image having high resolution and high definition can be obtained on various recording media, even if the resultant ink is printed at high speed.

Moreover, when the copolymer of the present invention is used as a pigment dispersing agent, a pigment dispersing element having high dispersibility and long-term stability can be obtained.

In the General Formula (1), X is a hydrogen atom or a cation. When X is a cation, oxygen adjacent to the cation exists as O⁻. Examples of the cation include a sodium ion, a potassium ion, a lithium ion, a tetramethyl ammonium ion, a tetraethyl ammonium ion, a tetrapropyl ammonium ion, a tetrabutyl ammonium ion, a tetrapentyl ammonium ion, a tetrahexyl ammonium ion, a triethylmethyl ammonium ion, a tributylmethyl ammonium ion, a trioctylmethyl ammonium ion, a 2-hydroxy ethyltrimethyl ammonium ion, a tris(2-hydroxy ethyl)methyl ammonium ion, a propyltrimethyl ammonium ion, a hexyltrimethyl ammonium ion, an octyltrimethyl ammonium ion, a nonyltrimethyl ammonium ion, a decyltrimethyl ammonium ion, a dodecyl trimethyl ammonium ion, a tetradecyltrimethyl ammonium ion, a hexadecyltrimethyl ammonium ion, an octadecyltrimethyl ammonium ion, a didodecyldimethyl ammonium ion, a ditetradecyldimethyl ammonium ion, a dihexadecyl dimethyl ammonium ion, a dioctadecyl dimethyl ammonium ion, an ethylhexadecyl dimethyl ammonium ion, an ammonium ion, a dimethyl ammonium ion, a trimethyl ammonium ion, a monoethyl ammonium ion, a diethylammonium ion, a triethyl ammonium ion, a monoethanol ammonium ion, a diethanol ammonium ion, a triethanol ammonium ion, a methylethanol ammonium ion, a methyl diethanol ammonium ion, a dimethyl ethanol ammonium ion, a monopropanol ammonium ion, a dipropanol ammonium ion, a tripropanol ammonium ion, an isopropanol ammonium ion, a morpholinium ion, a N-methyl morpholinium ion, a N-methyl-2-pyrrolidonium ion, and a 2-pyrrolidonium ion. These may be used alone or in combination thereof.

In the General Formula (2), R is a hydrogen atom or a methyl group, L is a single bond or —(CH$_2$)$_n$—O—CO— where n is an integer in a range of from 2 through 18. When L is the —(CH$_2$)$_n$—O—CO—, a carbonyl carbon atom in the —(CH$_2$)$_n$—O—CO— is bound to naphthyl.

A naphtyl group present at the end of the chain through the L has excellent adsorptive property to the pigment due to a π-π stacking with the pigment that is the colorant in the aqueous ink. Therefore, the naphtyl group is bound to the pigment on a recording medium during printing, and thus the pigment particles can cause rapid aggregation on the surface of the recording medium, which can prevent occurrence of beading. As is understood from the General Formula (1), the Structural Formula (1), and the General Formula (2), typically the structural units represented by the General Formula (1), the Structural Formula (1), and the General Formula (2) may be a main chain of the copolymer containing a pendant group such as the end naphthyl group and the side chain carboxyl group, each of which is a pendant through the L. Of course, however, the cases where the structural units represented by the General Formula (1), the Structural Formula (1), and the General Formula (2) are partially contained in a side chain of the copolymer are not excluded.

For example, it is a well-known fact that it is difficult to completely exclude secondary radical polymerization reaction for generating branched structures.

Moreover, when a copolymer of the present invention is used to prepare a pigment dispersing element obtained by dispersing a pigment in water, the naphthyl group is present at the end of the side chain of the copolymer, and thus is easily adsorbed to the surface of the pigment, and has high adsorptive property to the pigment. Therefore, a dispersion element having high dispersiveness and long-term stability can be obtained.

An amount of the structural unit represented by the General Formula (2) in the copolymer is preferably in a range of from 20 mol % through 80 mol %, more preferably in a range of from 35 mol % through 80 mol %, in terms of adsorbing a pigment. When the amount of the structural unit represented by the General Formula (2) is in a range of from 20 mol % through 80 mol %, the copolymer is improved in adsorbing a pigment, a speed of condensing the pigment on a recording medium rises, and the recording medium is prevented from causing beading (spots). When the copolymer is used as a pigment dispersing agent, dispersion stability is improved.

The total amount of the structural unit represented by the General Formula (1) and the structural unit expressed by the following Structural Formula (1) in the copolymer is preferably in a range of from 20 mol % through 80 mol %, more preferably in a range of from 50 mol % through 70 mol %.

A copolymer of the present invention is preferably formed through polymerization of a compound represented by the following General Formula (3), a compound expressed by the following Structural Formula (2), and a compound represented by the following General Formula (4).

(Chem. 7)

General Formula (3)

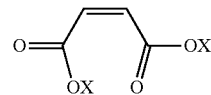

Here, in the General Formula (3), X is a hydrogen atom or a cation.

(Chem. 8)

Structural Formula (2)

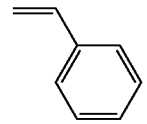

(Chem. 9)

General Formula (4)

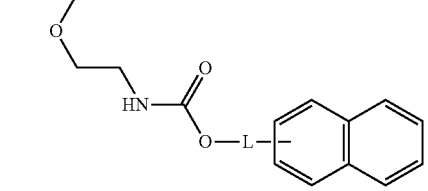

Here, in the General Formula (4), R is a hydrogen atom or a methyl group, L is a single bond or —(CH$_2$)$_n$—O—CO— where n is an integer in a range of from 2 through 18, and a carbonyl carbon atom in the —(CH$_2$)$_n$—O—CO— is bound to naphthyl.

In order to obtain a homogenous copolymer, the compound expressed by the Structural Formula (2) that is an electron-donating monomer is preferably allowed to polymerize with the compound represented by the General Formula (3) that is an electron-accepting monomer, in such amount that an amount of the compound expressed by the Structural Formula (2) is equivalent or more to an amount of the compound represented by the General Formula (3) by mole.

When the copolymer of the present invention is used as a pigment dispersing agent, an amount of the structural unit represented by the following General Formula (1) in the copolymer is preferably within such a range that the copolymer is easily dissolved in water, more preferably 20 mol % or more, still more preferably 30 mol % or more.

In terms of polystylene, a number average molecular weight of the copolymer of the present invention is in a range of from 500 through 10,000, and a weight average molecular weight of the copolymer of the present invention is in a range of from 1,500 through 30,000.

Another polymerizable monomer in the structural unit derived from another polymerizable monomer is not particularly limited and may be appropriately selected depending on the intended purpose. Examples of the another polymerizable monomer include a polymerizable hydrophobic monomer, a polymerizable hydrophilic monomer, and a polymerizable surfactant.

Examples of the polymerizable hydrophobic monomer include: an unsaturated ethylene monomer containing an aromatic ring such as alpha-methylstylene, 4-t-butyl stylene, and 4-chloromethylstylene; (meth)alkyl acrylate such as (meth)methyl acrylate, (meth)ethyl acrylate, (meth)acrylic acid-n-butyl, maleic acid dimethyl, itaconic acid dimethyl, fumaric acid dimethyl, (meth)lauryl acrylate (C12), (meth)acrylic acidtridecyl (C13), (meth)acrylic acid tetradecyl (C14), (meth)acrylic acid pentadecyl (C15), (meth)acrylic acid hexadecyl (C16), (meth)acrylic acid heptadecyl (C17), (meth)acrylic acid nonadecyl (C19), (meth)acrylic acideicosyl (C20), (meth)acrylic acid henicosyl (C21), and (meth)acrylic acid docosyl (C22); and an unsaturated ethylene monomer containing an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosen, and 1-docosene. These may be used alone or in combination thereof.

Examples of the polymerizable hydrophilic monomer include: an anionic unsaturated ethylene monomer such as maleic acid monomethyl, itaconic acid, itaconic acid monomethyl, fumaric acid, 4-stylene sulfonic acid, 2-acrylamide-2-methlypropane sulfonic acid, and an unsaturated ethylene monomer containing phosphate, phosphonic acid, alendronic acid, or etidronic acid; and a nonionic unsaturated ethylene monomer such as (meth)acrylic acid-2-hydroxy ethyl, diethylene glycol mono (meth)acrylate, triethylene glycol mono (meth)acrylate, tetraethylene glycol mono (meth)acrylate, polyethylene glycol mono (meth)acrylate, (meth)acrylamide, N-methylol (meth)acrylamide, N-vinyl formamide, N-vinyl acetamide, N-vinyl pyrrolidone, acrylamide, N,N-dimethyl acrylamide, N-t-butyl acrylamide, N-octylacrylamide, and N-t-octylacrylamide. These may be used alone or in combination thereof.

The total amount of the polymerizable hydrophobic monomer and the polymerizable hydrophilic monomer is not particularly limited and may be appropriately selected depending on the intended purpose, but it is preferably in a range of from 5% by mass through 100% by mass relative to the total amount of the monomer.

The polymerizable surfactant is an anionic surfactant or a nonionic surfactant having at least one radical-porimerizable, unsaturated double bond group in the molecule.

Examples of the anionic surfactant include a hydrocarbon compound containing a sulfate group such as an ammonium sulfate group ($-SO_3^-NH_4^+$) and an allyl group ($-CH_2-CH=CH_2$), a hydrocarbon compound containing a sulfate group such as an ammonium sulfate group ($-SO_3^-NH_4^+$) and a methacryl group [$-CO-C(CH_3)=CH_2$], and an aromatic hydrocarbon compound containing a sulfate group such as an ammonium sulfate group ($-SO_3^-NH_4^+$) and a 1-propenyl group ($-CH=CH_2CH_3$).

As the polymerizable surfactant, a commercially available product can be used. Examples of the commercially available product of the polymerizable surfactant include: ELEMINOL series (JS-20 and RS-300, both products of Sanyo Chemical Industries, Ltd.); and AQUALON KH-10, AQUALON KH-1025, AQUALON KH-05, AQUALON HS-10, AQUALON HS-1025, AQUALON BC-0515, AQUALON BC-10, AQUALON BC-1025, AQUALON BC-20, and AQUALON BC-2020 (all products of DKS Co. Ltd.). These may be used alone or in combination thereof.

Examples of the nonionic surfactant include a hydrocarbon compound and an aromatic hydrocarbon compound, each of which contains a 1-propenyl group ($-CH=CH_2CH_3$) and a polyoxyethylene group [$-(C_2H_4O)_n-H$].

As the nonionic surfactant, a commercially available product can be used. Examples of the commercially available product of the nonionic surfactant include: AQUALON RN-20, AQUALON RN-2025, AQUALON RN-30, and AQUALON RN-50 (all products of DKS Co. Ltd.); and LATEMUL PD-104, LATEMUL PD-420, LATEMUL PD-430, and LATEMUL PD-450 (all products of Kao Corporation). These may be used alone or in combination thereof.

An amount of the polymerizable surfactant is not particularly limited and may be appropriately selected depending on the intended purpose, but it is preferably in a range of from 0.1% by mass through 10% by mass, relative to the total amount of the monomer.

As illustrated in the following reaction formulas (1) to (3), the copolymer of the present invention can be obtained as follows. First, naphthalene carbonyl chloride (A-1) and an excess amount of a diol component (note that, in the following reaction formulas, L' represents an alkylene group) are allowed to react through condensation reaction in the presence of an acid accepting agent such as amine or pyridine, to obtain naphthalenecarboxylic acid hydroxy alkyl ester (A-2). Next, 2-methacryloyloxyethyl isocyanate (A-3) and the (A-2) are allowed to react, to obtain monomer (A-4). Then, the monomer (A-4) is allowed to copolymerize with stylene monomer (A-5) and maleic acid monomer (A-6) in the presence of a radical polymerization initiator, to obtain a copolymer (A-7) of the present invention.

Here, a weight average molecular weight of the monomer (A-4) is in a range of from 357 through 596 because L in the General Formula (3) is an alkylene group having 2 through 18 carbon atoms, and R in the General Formula (3) is a hydrogen atom or a methyl group.

(Chem. 10)

Reaction Formula (1)

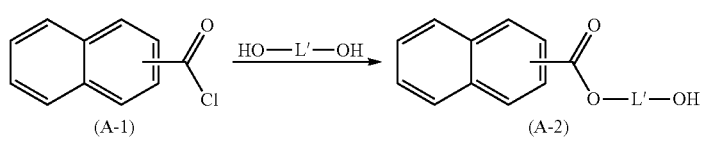

(A-1)     (A-2)

(Chem. 11)

Reaction Formula (2)

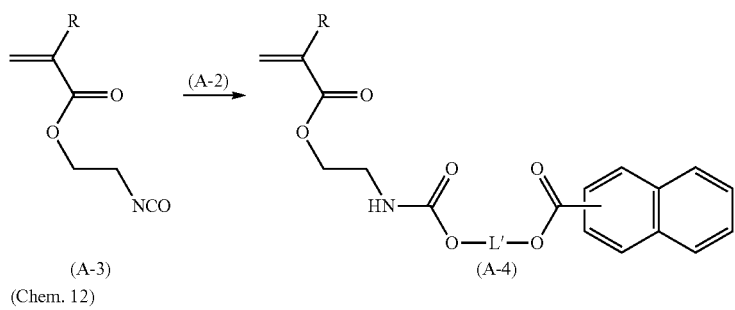

(Chem. 12)

Reaction Formula (3)

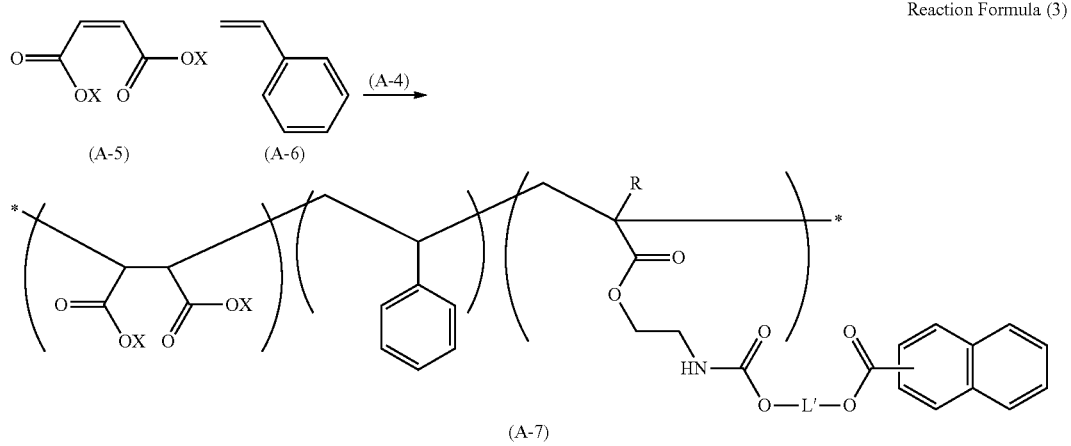

The radical polymerization initiator is not particularly limited and may be appropriately selected depending on the intended purpose. Examples of the radical polymerization initiator include peroxy ketal, hydroperoxide, dialkyl peroxide, diacyl peroxide, peroxydicarbonate, peroxy ester, cyano azobis isobutyronitrile, azobis(2-methyl butyronitrile), azobis(2,2'-isovaleronitrile), and non-cyano dimethyl 2,2'-azobis isobutyrate. These may be used alone or in combination thereof. Among them, an organic peroxide and an azo-compound are preferable, an azo-compound is particularly preferable, because a molecular weight is easy to control and decomposition temperature is low.

An amount of the radical polymerization initiator is not particularly limited and may be appropriately selected depending on the intended purpose, but it is preferably in a range of from 1% by mass through 10% by mass relative to the total amount of the porimerizable monomer.

In order to adjust an average molecular weight of the copolymer, a proper amount of a chain transfer agent may be added to the copolymer.

Examples of the chain transfer agent include mercaptoacetic acid, mercapto propionic acid, 2-propanethiol, 2-mercaptoethanol, thiophenol, dodecyl mercaptan, 1-dodecanethiol, and thioglycerol.

A polymerization temperature is not particularly limited and may be appropriately selected depending on the intended purpose, but it is preferably in a range of from 50 degrees Celsius through 150 degrees Celsius, more preferably in a range of from 60 degrees Celsius through 100 degrees Celsius. A polymerization time is not particularly limited and may be appropriately selected depending on the intended purpose, but it is preferably in a range of from 3 hours through 48 hours.

(Aqueous Ink)

An aqueous ink of the present invention contains water, a colorant, and the copolymer of the present invention, preferably contains an aqueous organic solvent and a surfactant, further contains other components, if necessary.

When the aqueous ink of the present invention that contains a copolymer of the present invention is recorded on plain paper, high image density can be obtained. Moreover, the aqueous ink is excellent in storage stability, and does not cause beading (spots) during high-speed printing.

<Colorant>

As the colorant, a pigment or a dye can be used. A pigment is preferable because it is more excellent in adsorbing the copolymer to the colorant, and is more excellent in water resistance and light resistance than a dye.

The pigment is not particularly limited and may be appropriately selected depending on the intended purpose. Examples of the pigment include an inorganic pigment and an organic pigment for black or colors. These may be used alone or in combination thereof.

As the inorganic pigment, titanium oxide, iron oxide, calcium carbonate, aluminum oxide, barium sulfate, aluminum hydroxide, barium yellow, cadmium red, chrome yellow, and carbon black produced by a known method such as a contact method, a furnace method, and a thermal method can be used.

Examples of the pigment for black include: carbon black (C.I. Pigment Black 7) such as furnace black, lamp black, acetylene black, and channel black; a metal such as copper and iron (C.I. Pigment Black 11); a metal oxide compound, such as titanium oxide; and an organic pigment such as aniline black (C.I. Pigment Black 1). The carbon black is preferably produced by a furnace method or a channel method. A primary particle diameter of the carbon black is preferably in a range of from 15 nm through 40 nm. A specific surface area of the carbon black is preferably in a range of from 50 m$^2$/g through 300 m$^2$/g as measured based on BET method. A DBP oil absorption of the carbon black is preferably in a range of from 40 mL/100 g through 150 mL/100 g. A volatile matter content in the carbon black is preferably in a range of from 0.5% through 10%. A pH of the carbon black is preferably in a range of from 2 through 9.

Examples of the organic pigment include: an azo pigment (e.g., azo lake, an insoluble azo pigment, a condensed azo pigment, and a chelate azo pigment); a polycyclic pigment (e.g., a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinophthalone pigment); and a dye chelate (e.g., a basic dye chelate and an acid dye chelate); a nitro pigment; a nitroso pigment; and aniline black. Among these pigments, a pigment excellent in compatibility with water is preferable.

Examples of the azo pigment include azo lake, an insoluble azo pigment, a condensed azo pigment, and a chelate azo pigment.

Examples of the polycyclic pigment include a phthalocyanine pigment, a perylene pigment, a perynone pigment, an anthraquinone pigment, a quinacridone pigment, a dioxazine pigment, an indigo pigment, a thioindigo pigment, an isoindolinone pigment, a quinophthalone pigment, and Rhodamine B Lake pigment.

Examples of the dye chelate include a basic dye chelate and an acid dye chelate.

A pigment for yellow is not particularly limited and may be appropriately selected depending on the intended purpose. Examples of the pigment for yellow include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

A pigment for magenta is not particularly limited and may be appropriately selected depending on the intended purpose. Examples of the pigment for magenta include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and Pigment Violet 19.

A pigment for cyan is not particularly limited and may be appropriately selected depending on the intended purpose. Examples of the pigment for cyan include C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66; C.I. Vat Blue 4, and C.I. Vat Blue 60.

When the aqueous ink contains: C.I. Pigment Yellow 74 as the yellow pigment; C.I. Pigment Red 122 and C.I. Pigment Violet 19 as the magenta pigment; and C.I. Pigment Blue 15:3 as the cyan pigment, the well-balanced aqueous ink excellent in color tone and light resistance can be obtained.

A colorant newly produced for the present invention can be used for the aqueous ink of the present invention.

In terms of color developing property of the obtained image, a self-dispersible pigment may be used in the aqueous ink, an anionic self-dispersible pigment is preferably used.

The anionic self-dispersible pigment is a pigment in which an anionic functional group is introduced to the surface of the pigment directly or via another atom group, to be stably dispersed.

As a pigment before such a treatment for stabilization in dispersion, for example, various known pigments as described in WO2009/014242 can be used.

Note that, the anionic functional group is a functional group where more than half of the hydrogen ions are disassociated at pH 7.0. Examples of the anionic functional group include a carboxyl group, a sulfo group, and a phosphonic acid group. Among them, a carboxyl group and a phosphonic acid group are preferable because optical density of the obtained image can be improved.

As a method for introducing the anionic functional group to the surface of the pigment, a method for applying oxidation treatment to carbon black can be used.

Examples of the method for applying oxidation treatment include a method for treating the pigment with hypochlorite acid, ozone water, hydrogen peroxide, chlorite, or nitric acid; and a method for treating the surface of the pigment using diazonium salt as described in Japanese Patent No. 3808504, Japanese Translation of PCT International Application Publication Nos. JP-T-2009-515007 and 2009-506196. Examples of a commercially available pigment obtained by introducing a hydrophilic functional group to the surface of the pigment include CW-1, CW-2, and CW-3 (all products of ORIENT CHEMICAL INDUSTRIES CO., LTD.); and CAB-O-JET 200, CAB-O-JET 300, and CAB-O-JET 400 (all products of Cabot).

An amount of the pigment in the aqueous ink is not particularly limited and may be appropriately selected depending on the intended purpose, but it is preferably in a range of from 0.5% by mass through 20% by mass, more preferably in a range of from 1% by mass through 10% by mass.

As the dye, dyes such as an acid dye, a direct dye, a basic dye, a reactive dye, a food color classified in the color index can be used.

Examples of the acid dye and the food color include: C.I. Acid Black series (1, 2, 7, 24, 26, and 94); C.I. Acid Yellow series (17, 23, 42, 44, 79, and 142); C.I. Acid Blue series (9, 29, 45, 92, and 249); C.I. Acid Red series (1, 8, 13, 14, 18, 26, 27, 35, 37, 42, 52, 82, 87, 89, 92, 97, 106, 111, 114, 115, 134, 186, 249, 254, and 289); C.I. Food Black series (1 and 2); C.I. Food Yellow series (3 and 4); and C.I. Food Red series (7, 9, and 14).

Examples of the direct dye include: C.I. Direct Black series (19, 22, 32, 38, 51, 56, 71, 74, 75, 77, 154, (168), and 171); C.I. Direct Yellow series (1, 12, 24, 26, 33, 44, 50, 86, 120, 132, 142, and 144); C.I. Direct Blue series (1, 2, 6, 15, 22, 25, 71, 76, 79, 86, 87, 90, 98, 163, 165, 199, and 202); C.I. Direct Red series (1, 4, 9, 13, 17, 20, 28, 31, 39, 80, 81, 83, 89, 225, and 227); and C.I. Direct Orange series (26, 29, 62, and 102).

Examples of the basic dye include: C.I. Basic Black series (2 and 8); C.I. Basic Yellow series (1, 2, 11, 13, 14, 15, 19, 21, 23, 24, 25, 28, 29, 32, 36, 40, 41, 45, 49, 51, 53, 63, 64, 65, 67, 70, 73, 77, 87, and 91); C.I. Basic Blue series (1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155); and C.I. Basic Red series (2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112).

Examples of the reactive dye include: C.I. Reactive Black series (3, 4, 7, 11, 12, and 17); C.I. Reactive Yellow series (1, 5, 11, 13, 14, 20, 21, 22, 25, 40, 47, 51, 55, 65, and 67); C.I. Reactive Blue series (1, 2, 7, 14, 15, 23, 32, 35, 38, 41, 63, 80, and 95); and C.I. Reactive Red series (1, 14, 17, 25, 26, 32, 37, 44, 46, 55, 60, 66, 74, 79, 96, and 97).

<Water>

Examples of the water include pure water such as ion-exchanged water and distilled water, and ultrapure water.

<Aqueous Organic Solvent>

The aqueous ink of the present invention preferably contains an aqueous organic solvent in order to improve permeability to plain paper or coated paper, to prevent occurrence of beading, and to prevent the ink from drying through a moistening effect. The aqueous organic solvent is not particularly limited and may be appropriately selected depending on the intended purpose. Examples of the aqueous organic solvent include: polyvalent alcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, trimethylolethane, trimethylolpropane, 1,5-pentanediol, 1,6-hexanediol, hexylene glycol, glycerin, 1,2,3-butanetriol, 1,2,4-butanetriol, 1,2,6-hexanetriol, isopropylidene glycerol, and 3-methylpentane-1,3,5-triol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyvalent alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxy ethyl-2-pyrrolidone, 1,3-dimethyl imidazolidinone, epsilon-caprolactam, and gamma-butyrolactone; amides such as formamide, N-methylformamide, N,N-dimethyl formamide, 3-methoxy-N,N-dimethyl propionamide, and 3-butoxy-N,N-dimethyl propionamide; amines such as monoethanol amine, diethanol amine, triethanol amine, monoethyl amine, diethylamine, and trimethyl amine; sulfer-containing compounds such as dimethyl sulfoxide, sulfolane, and thiodiethanol; 3-ethyl-3-hydroxy methyloxetan; propylene carbonate; and ethylene carbonate. These may be used alone or in combination thereof. Among them, 3-ethly-3-hydroxy methyloxetan, isopropylidene glycerol, N,N-dimethyl beta-methoxypropionamide, and N,N-dimethyl beta-butoxypropionamide are preferable because these compounds prevent plain paper from causing curl. Also, diethylene glycol, triethylene glycol, 1,3-butanediol, 2,2,4-trimethyl-1,3-pentanediol, and glycerin are excellent because the resultant ink is prevented from ejection failure.

Examples of an aqueous organic solvent having relatively low wettability and having permeability include 2-ethyl-1,3-hexanediol [solubility: 4.2% (25 degrees Celsius)], and 2,2,4-trimethyl-1,3-pentanediol [solubility: 2.0% (25 degrees Celsius)].

Examples of an aqueous organic solvent other than the aforementioned aqueous organic solvents include aliphatic diols such as 2-ethyl-2-methyl-1,3-propanediol, 2,2-diethyl-1,3-propanediol, 2-methyl-2-propyl-1,3-propanediol, 3,3-dimethyl-1,2-butanediol, 2,4-dimethyl-2,4-pentanediol, 2,5-dimethyl-2,5-hexanediol, and 5-hexene-1,2-diol.

Examples of other aqueous organic solvents that can be used in combination with the aqueous organic solvent include alkyl of polyvalent alcohol and aryl ethers such as diethylene glycol monobutyl ether, propylene glycol monobutyl ether, ethylene glycol monophenyl ether, diethylene glycol monophenyl ether, ethylene glycol monoaryl ether, and tetraethylene glycol chlorophenyl ether; and lower alcohols such as ethanol.

<Surfactant>

The aqueous ink of the present invention preferably contains a surfactant in order to improve wettability and permeability to plain paper and coated paper, and to prevent an image from causing beading.

Examples of the surfactant include a fluorine surfactant, a silicone surfactant, an anionic surfactant, a nonionic surfactant, and a betaine surfactant. These may be used alone or in combination thereof. Among them, a fluorine surfactant and a silicone surfactant are preferable because the surface tension can be reduced to be 30 mN/m or less.

Examples of the fluorine surfactant include a nonionic fluorine surfactant, an anionic fluorine surfactant, an amphoteric fluorine surfactant, and an oligomer fluorine surfactant. The number of carbons substituted with fluorine is in a range of from 2 through 16, more preferably in a range of from 4 through 16. When the number of carbons substituted with fluorine is 2 to 16, characteristic effects of the fluorine surfactant can be obtained and storage ability of the ink can be improved.

Examples of the nonionic fluorine surfactant include a perfluoroalkyl phosphoric acid ester compound, a perfluoroalkyl ethylene oxide adduct, and a polyoxyalkylene ether polymer compound containing a perfluoro alkylether group at a side chain of the polymer. Among them, a polyoxyalkylene ether polymer compound containing a perfluoro alkylether group at a side chain of the polymer is preferable in terms of low foaming property, and a fluorine surfactant represented by the following General Formula (5) is more preferable.

$CF_3CF_2(CF_2CF_2)m-CF_2CF_2(CF_2CF_2)nH$ General Formula (5) (where in the General Formula (5), m is in a range of from 0 through 10, and n is in a range of from 0 through 40.)

Examples of the anionic fluorine surfactant include a perfluoroalkyl sulfonic acid compound, a perfluoroalkyl carboxylic acid compound, a perfluoroalkyl phosphoric acid ester compound, and a polyoxyalkylene ether polymer compound containing a perfluoproalkyl ether group at a side chain of the polymer.

Examples of the perfluoroalkyl sulfonic acid compound include perfluoroalkyl sulfonic acid and perfluoroalkyl sulfonic acid salt.

Examples of the perfluoroalkyl carboxylic acid compound include perfluoroalkyl carboxylic acid and perfluoroalkyl carboxylic acid salt.

Examples of the perfluoroalkyl phosphoric acid ester compound include perfluoroalkyl phosphoric acid ester and perfluoroalkyl phosphoric acid ester salt.

Examples of the polyoxyalkylene ether polymer compound containing a perfluoproalkyl ether group at a side chain of the polymer include polyoxyalkylene ether polymer containing a perfluoroalkylether group at a side chain of the polymer, sulfuric ester salt of polyoxyalkylene ether polymer containing a perfluoroalkyl ether group at a side chain of the polymer, and polyoxyalkylene ether polymer salt containing a perfluoalkyl ether group at a side chain of the polymer.

Examples of a counter ion of the salt in the fluorine surfactant include Li, Na, K, $NH_4$, $NH_3CH_2CH_2OH$, $NH_2(CH_2CH_2OH)_2$, and $NH(CH_2CH_2OH)_3$.

Examples of commercially available products of the fluorine surfactant include: SURFLON series (S-111, S-112, S-113, S-121, S-131, S-132, S-141, and S-145, all products of AGC Seimi Chemical Co., Ltd.); FLUORAD series (FC-93, FC-95, FC-98, FC-129, FC-135, FC-170C, FC-430, and FC-431, all products of Sumitomo 3M limited); MEGAFACE series (F-470, F-1405, and F-474, all products of DIC Corporation); ZONYL series (TBS, FSP, FSA, FSN-100, FSN, FSO-100, FSO, FS-300, and UR, all products of Du Pont Kabushiki Kaisha); FTERGENT series (FT-110, FT-250, FT-251, FT-4005, FT-150, and FT-400SW, all products of NEOS COMPANY LIMITED); and POLYFOX series (PF-136A, PF-156A, PF-151N, PF-154, and PF-159, all products of Omnova Solutions, Inc.). These may be used alone or in combination thereof.

Among them, FS-300 (product of Du Pont Kabushiki Kaisha); FT-110, FT-250, FT-251, FT-4005, FT-150, and FT-400SW (all products of NEOS COMPANY LIMITED); and POLYFOX PF-151N (product of Omnova Solutions, Inc.) are particularly preferable because good text quality, particularly color developing property and ability to uniformly dye paper can be considerably improved.

The silicone surfactant is not particularly limited and may be appropriately selected depending on the intended purpose. Examples of the silicone surfactant include side chain-modified polydimethylsiloxane, both terminals-modified polydimethylsiloxane, one terminal-modified polydimethylsiloxane, and side chain both terminals-modified polydimethylsiloxane.

Among them, particularly preferable is a polyether-modified silicone surfactant containing a polyoxyethylene group or a polyoxyethylene polyoxypropylene group as a modified group because it exhibits good properties as an aqueous surfactant.

Commercially available products of the silicone surfactant can be obtained from BYK Japan K.K., Shin-Etsu Chemical Co., Ltd., Dow Corning Toray Co., Ltd., Nihon Emulsion Co., Ltd., and Kyoeisha Chemical Co., Ltd.

Examples of the anionic surfactant include polyoxyethylene alkylether acetate, dodecylbenzenesulfonate, lauric acid salt, and polyoxyethylene alkylether sulfate salt. Examples of the nonionic surfactant include polyoxyethylene alkylether, polyoxypropylene alkylether, polyoxyethylene alkyl ester, polyoxyethylene sorbitan fatty acid ester, polyoxyethylene alkyl phenyl ether, polyoxyethylene alkyl amine, and polyoxyethylene alkylamide.

<Other Components>

As the aforementioned other components, a pH adjuster, an antiseptic mildewproofing agent, an anti-rust agent, an antioxidant, an ultraviolet absorber, an oxygen absorber, and a light stabilizer can be added, if necessary.

The pH adjuster is not particularly limited and may be appropriately selected depending on the intended purpose, so long as the pH adjuster can adjust pH to a range of from 8.5 through 11 without adversely influencing the ink to be blended. Examples of the pH adjuster include alcohol amines, hydroxides of alkali metal elements, hydroxides of ammonium, hydroxides of phosphonium, and carbonates of alkali metal elements.

Examples of the alcohol amines include diethanol amine, triethanol amine, and 2-amino-2-ethyl-1,3-propanediol.

Examples of the hydroxides of alkali metal elements include lithium hydroxide, sodium hydroxide, and potassium hydroxide.

Examples of the hydroxides of ammonium include ammonium hydroxide and tertiary ammonium hydroxide.

Examples of the hydroxides of phosphonium include tertiary phosphonium hydroxide.

Examples of the carbonates of alkali metal elements include lithium carbonate, sodium carbonate, and potassium carbonate.

Examples of the antiseptic mildewproofing agent include sodium dehydroacetate, sodium sorbate, 2-pyridinethiol-1-oxide sodium, sodium benzoate, and sodium pentachlorophenolate.

Examples of the anti-rust agent include acid sulfite salt, sodium thiosulfate, ammonium thiodiglycolate, diisopropyl ammonium nitrate, pentaerythritol tetranitrate, and dicyclohexyl ammonium nitrate.

Examples of the antioxidant include a phenol antioxidant (including hindered phenol antioxidant), an amine antioxidant, a sulfer antioxidant, and a phosphorus antioxidant.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

The aqueous ink of the present invention can be produced by dispersing or dissolving, in an aqueous medium, the water, the colorant, and the copolymer; preferably the aqueous organic solvent and the surfactant; and the other components, if necessary, to stir and mix the resultant solution. Note that, as a pigment dispersing agent, the copolymer may be used to prepare the pigment dispersing element.

The dispersing can be performed by a sand mill, a homogenizer, a ball mill, a paint shaker, or an ultrasonic disperser. The stirring and mixing can be performed by a stirrer with a typical stirring blade, a magnetic stirrer, or a high speed disperser.

If necessary, a filter or a centrifuge device is preferably used to filtrate coarse particles for degassing.

Physical properties of the aqueous ink of the present invention are not particularly limited and may be appropriately selected depending on the intended purpose, but a viscosity and a surface tension of the aqueous ink are preferably within the following ranges.

A viscosity of the aqueous ink is preferably in a range of from 3 mPa·s through 20 mPa·s at 25 degrees Celsius. When the viscosity of the aqueous ink is 3 mPa·s or more, an effect of improvement in printing density and character quality can be obtained. When the viscosity of the aqueous ink is 20 mPa·s or less, ejection property of the ink can be ensured.

The viscosity of the aqueous ink can be measured at 25 degrees Celsius using, for example, a viscometer (RE 80L, product of Toki Sangyo Co., Ltd.).

A surface tension of the aqueous ink is preferably 40 mN/m or less at 25 degrees Celsius.

(Ink Cartridge)

An ink cartridge of the present invention contains a container and the aqueous ink housed in the container, and contains other members that are appropriately selected, if necessary.

The container is not particularly limited, and a shape, a structure, a size, and a material of the container can be appropriately selected depending on the intended purpose. For example, the container having an ink bag made of an aluminum laminated film or a resin film is preferable.

The ink cartridge will be described with reference to FIG. 1 and FIG. 2.

FIG. 1 is a view illustrating one example of an ink cartridge of the present invention. FIG. 2 is a view illustrating the ink cartridge illustrated in FIG. 1 and a case (exterior) of the ink cartridge. In an ink cartridge 200, an ink bag 241 is filled with ink via an ink inlet 242, the air is discharged from the ink bag 241, and then the ink inlet 242 is sealed by welding.

When the ink is used, a needle provided in a device main body is stuck into an ink outlet 243 made of a rubber member, to provide the ink to the device. The ink bag 241 is made of a packing member such as an aluminum laminated film with no air permeability. As illustrated in FIG. 2, this ink bag 241 is housed in a cartridge case 244 made of plastic, and is configured to be detachably mounted on various inkjet recording devices.

(Inkjet Recording Method and Inkjet Recording Device)

An inkjet recording method of the present invention includes an ink jetting step, and further includes a heating step and other steps, if necessary.

An inkjet recording device of the present invention includes an ink jetting unit, and further includes a heating unit and other units, if necessary.

The inkjet recording method of the present invention can be suitably performed by the inkjet recording device of the present invention. The ink jetting step can be suitably performed by the ink jetting unit. The heating step can be suitably performed by the heating unit. The aforementioned other steps can be performed by the aforementioned other units.

—Ink Jetting Step and Ink Jetting Unit—

The ink jetting step is a step of applying a stimulus (energy) to the ink of the present invention to allow the ink to jet from various nozzles for ejecting the ink, to form an image on a recording medium.

The ink jetting unit is a unit configured to apply a stimulus (energy) to the ink of the present invention to allow the ink to jet from various nozzles for ejecting the ink, to form an image on a recording medium.

The stimulus is not particularly limited and may be appropriately selected depending on the intended purpose. Examples of the stimulus include heat (temperature), pressure, vibration, and light. These may be used alone or in combination thereof. Among them, heat and pressure are suitable.

As aspects of jetting the ink, for example, there are a piezoelectric method, a thermal method, and an electrostatic method. Here, the piezoelectric method is a method where a shape of a vibrating plate constituting a wall of an ink channel is deformed to change volume in the ink channel using piezo elements as a pressure generating unit configured to apply pressure to the ink in the ink channel, to eject ink droplets (see, Japanese Examined Patent Publication No. 02-51734). The thermal method is a method where ink is heated using a heating resistor in an ink channel for generating bubbles to eject ink droplets (see, Japanese Examined Patent Publication No. 61-59911). The electrostatic method is a method where a vibrating plate and an electrode, both of which constitute a wall of an ink channel, are disposed so as to face each other, a shape of the vibrating plate is deformed by electrostatic force generated between the vibration plate and the electrode, and then volume in the ink channel is changed to eject ink droplets (see, Japanese Unexamined Patent Application Publication No. 06-71882).

A size of a droplet of the ink to be jetted is preferably in a range of from 3 pL through 40 pL. A speed of ejecting and spaying the ink droplets to be jetted is preferably in a range of from 5 m/s through 20 m/s. A drive frequency of the ink droplets to be jetted is preferably 1 kHz or more. A resolution of the ink droplets is preferably 300 dpi or more.

—Heating Step and Heating Unit—

The heating step is a step of heating the recording medium on which an image is recorded.

The heating unit is a unit configured to heat the recording medium on which an image is recorded.

The inkjet recording method and the inkjet recording device can record an image having high quality on a non-penetrant recording medium. However, in order to form an image having higher quality, higher rubbing resistance, and higher adhesive property to the recording medium, and to respond to high-speed recording conditions, the non-penetrant recording medium is preferably heated after printing. The recording medium is subjected to the heating step after recording an image, and then a resin contained in the ink is improved in forming a film, which leads to improvement of image density of the recorded matter.

As a device used for the heating step, various known devices can be used. Examples of the device used for the heating step include devices for forced-air heating, radiation heating, conduction heating, high-frequency wave drying, or micro-wave drying. These may be used alone or in combination thereof.

A temperature of the heating can be changed depending on the kind of the organic solvent contained in the ink, an amount of the organic solvent contained in the ink, and a minimum film forming temperature of a resin emulsion to be added, and can be further changed depending on the kind of recording medium to be printed.

The temperature of the heating is preferably high in terms of drying property and a temperature of forming a film, but it is preferably in a range of from 40 degrees Celsius through 120 degrees Celsius, more preferably in a range of from 40 degrees Celsius through 100 degrees Celsius, still more preferably in a range of from 50 degrees Celsius through 90 degrees Celsius.

Here, an inkjet recording device configured to record an image using the ink will be described with reference to the drawings. Examples of the inkjet recording device include: a serial (shuttle) type inkjet recording device in which the carriage is used for scanning; and a line inkjet recording device equipped with a line head. FIG. 6 is a schematic view illustrating one example of a serial type inkjet recording device of the present invention. FIG. 7 is a schematic view illustrating configuration of a main body of the device illustrated in FIG. 6.

As illustrated in FIG. 6, the inkjet recording device includes a device main body 101, a paper feeding tray 102 disposed in the device main body 101, a paper discharging tray 103, and an ink cartridge loading section 104. On the upper surface of the ink cartridge loading section 104, a control section 105 such as operation keys and a display is disposed. The ink cartridge loading section 104 includes a front cover 115 that can be opened and closed for attaching or detaching the ink cartridge 201. The reference numeral 111 is a head cover and the reference numeral 112 is a front cover of the device main body.

In the device main body 101 as illustrated in FIG. 7, a carriage 133 is slidably maintained in a main-scanning direction by a guide rod 131 and a stay 132, where the guide rod 131 is a guide member bridged between left and right side plates (not illustrated). The carriage 133 is moved for scanning by a main scanning motor (not illustrated).

A recording head 134 is composed of four inkjet recording heads, each of which is configured to eject ink droplets of yellow (Y), cyan (C), magenta (M) and black (Bk), and is installed in the carriage 133 such that a plurality of ink ejection outlets are aligned in the direction intersecting the main-scanning direction and that a direction of the ink droplet ejection faces downward.

As the inkjet recording heads constituting the recording head 134, it is possible to use, for example, a head provided with any of the following energy-generating units for ejecting ink: a piezoelectric actuator such as a piezoelectric element; a thermal actuator utilizing a phase change due to film boiling of liquid caused by using an electric-heat transducer such as a heat element; a shape memory alloy actuator utilizing a metal phase change due to a temperature change; and an electrostatic actuator utilizing electrostatic force.

Also, the carriage 133 is provided with sub-tanks 135 for each color configured to supply each color ink to the recording head 134. Each sub-tank 135 is supplied and replenished with the ink from the ink cartridge 201 loaded into the ink cartridge loading section 104, via an ink supply tube (not illustrated).

Meanwhile, as a paper feeding section configured to feed sheets of recording medium 142 loaded on a recording medium loading section (pressure plate) 141 of the paper feed tray 102, there are provided a half-moon roller (paper feeding roller 143) which feeds sheets of recording medium 142 one by one from the recording medium loading section 141, and a separation pad 144 which faces the paper feeding roller 143 and is formed of a material with a large friction coefficient. The separation pad 144 is biased toward the paper feeding roller 143 side.

As a conveyance section configured to convey the sheet of recording medium 142, which has been fed from the paper feeding section, underneath the recording head 134, there are provided a conveyance belt 151 configured to convey the sheet of recording medium 142 by electrostatic attraction; a counter roller 152 configured to convey the sheet of recording medium 142, which is fed from the paper feeding section via a guide 145, while the recording medium is sandwiched between the counter roller and the conveyance belt 151; a conveyance guide 153 configured to make the sheet of recording medium 142, which is fed upward in the substantially vertical direction, change its direction by approximately 90° and thusly run along the conveyance belt 151; and an end pressurizing roller 155 biased toward the conveyance belt 151 side by a pressing member 154. Moreover, a charging roller 156 as a charging unit configured to charge the surface of the conveyance belt 151 is provided.

The conveyance belt 151 is an endless belt; and is capable of rotating around in a belt conveyance direction by stretching between a heater-type conveyance roller 157 and a tension roller 158. The conveyance belt 151 includes, for example, a surface layer serving as a paper adsorbing surface, which is formed of a resinous material such as an ethylene-tetrafluoroethylene copolymer (ETFE) having a thickness of approximately 40 mm for which resistance control has not been conducted; and a back layer (intermediate resistance layer, ground layer) which is formed of the same material as the surface layer, and for which resistance control has been conducted using carbon. On the back of the conveyance belt 151, a heater-type guide member 161 is placed correspondingly to a region where printing is carried out by the recording head 134. Additionally, as a paper discharge section configured to discharge the recording medium 142 on which an image has been recorded by the recording head 134, there are provided a separation claw 171 configured to separate the recording medium 142 from the conveyance belt 151, a paper discharge roller 172, and a paper discharge roller 173. The recording medium 142 is dried with heated air by a fan heater (not illustrated), and then is discharged to the paper discharging tray 103 placed below the paper discharge roller 172.

A double-sided paper feeding unit 181 is detachably mounted on a rear surface portion of the device main body 101. The double-sided paper feeding unit 181 takes in the recording medium 142 returned by rotation of the conveyance belt 151 in the opposite direction and reverses it, then refeeds it between the counter roller 152 and the conveyance belt 151. Additionally, a manual paper feeding section 182 is provided on an upper surface of the double-sided paper feeding unit 181.

In the inkjet recording device, the recording medium 142 are fed one by one from the paper feeding section, and the recording medium 142 fed upward in the substantially vertical direction is guided by the guide 145 and conveyed with being sandwiched between the conveyance belt 151 and the counter roller 152. Further, an end of the sheet of paper is guided by the conveyance guide 153 and pressed onto the conveyance belt 151 by the end pressurizing roller 155, so that the conveyance direction of the sheet of paper is changed by approximately 90°. On this occasion, the conveyance belt 151 is charged by the charging roller 156, and the sheet of paper 142 is electrostatically attracted to be conveyed onto the conveyance belt 151.

Here, the recording head 134 is driven according to an image signal while moving the carriage 133, ink droplets are ejected onto the stopped recording medium to perform recording for one line, the recording medium is conveyed by a predetermined distance, and then recording for next line is performed. On receipt of a recording completion signal or a signal indicating that a rear end of the recording medium 142 reaches a recording region, recording operation is finished, and the recording medium 142 is discharged onto the paper discharge tray 103.

<Recorded Matter>

A recorded matter of the present invention contains an image recorded with the ink on a recording medium.

The recording medium is not particularly limited and may be appropriately selected depending on the intended purpose. Examples of the recording medium include plain paper, glossy paper, special paper, cloth, and non-permeable recording medium.

EXAMPLES

The present invention will be described hereinafter. However, the present invention may not be construed as being limited to the Examples. Unless otherwise specified, "part (s)" means "part(s) by mass", and "%" means "% by mass".

Each of the molecular weights of the copolymers obtained in the following Examples and Comparative Examples was determined as follows.

<Measurement of Molecular Weight of Copolymer>

Each of the molecular weights of the copolymers was measured by GPC (Gel Permeation Chromatography) based on the following conditions.

Device: GPC-8020 (product of Tosoh Corporation)
Column: TSK G2000HXL and G4000HXL (product of Tosoh Corporation)
Temperature: 40 degrees Celsius
Solvent: THF (tetrahydrofuran)
Flow velocity: 1.0 mL/min A copolymer having a concentration of 0.5% (1 mL) was charged into the above device to measure the copolymer under the above condition. A number average molecular weight (Mn) and a weight average molecular weight (Mw) of the copolymer were calculated using a calibration curve of the molecular weight prepared from monodispersed polystyrene standard sample in the molecular weight distribution.

Example 1: Synthesis of Copolymer CP-1

First, 62.0 g (525 mmol) of 1,6-hexanediol (product of Tokyo Chemical Industry Co., Ltd.) was dissolved in 700 mL of methylene chloride, followed by adding 20.7 g (262 mmol) of pyridine.

To the aforementioned solution, a solution obtained by dissolving 50.0 g (262 mmol) of 2-naphthalene carbonyl chloride (product of Tokyo Chemical Industry Co., Ltd.) in 100 mL of methylene chloride was added dropwise, while stirring for 2 hours, followed by stirring at room temperature (25 degrees Celsius) for 6 hours. The obtained reaction solution was washed with water, to isolate an organic phase. Then, the organic phase was dried with magnesium sulfate, to remove the solvent. The residue was purified by silica gel column chromatography using a mixture solvent of methylene chloride/methanol (volume ratio: 98/2) as an eluent, to obtain 52.5 g of 2-naphthoic acid-6-hydroxyhexyl ester.

Next, 42.1 g (155 mmol) of the 2-naphthoic acid-6-hydroxyhexyl ester was dissolved in 80 mL of dry methyl ethyl ketone, and the resultant solution was heated to 60 degrees Celsius. To the aforementioned solution, a solution obtained by dissolving 24.0 g (155 mmol) of 2-methacryloyloxyethyl isocyanate (KARENZ MOI, product of Showa Denko K.K.) in 20 mL of methylene chloride was added dropwise, while stirring for 1 hour, followed by stirring at 70 degrees Celsius for 12 hours. The resultant solution was cooled to room temperature (25 degrees Celsius), to remove the solvent. The residue was purified by silica gel column chromatography using a mixture solvent of methylene chloride/methanol (volume ratio: 99/1) as an eluent, to obtain 57.0 g of monomer M-1 expressed by the following Structural Formula (3-1).

(Chem. 13)

Structural Formula (3-1)

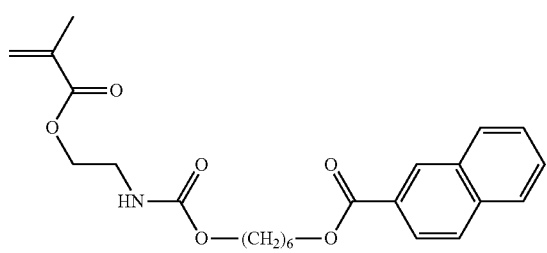

Next, 1.00 g (8.6 mmol) of maleic acid (product of Tokyo Chemical Industry Co., Ltd.) was dissolved in 5 mL of methyl ethyl ketone, and the resultant solution was heated to 75 degrees Celsius under an argon stream. To the aforementioned solution, a solution obtained by dissolving 0.90 g (8.6 mmol) of stylene (product of Wako Pure Chemical Industries, Ltd.), 4.60 g (10.8 mmol) of the monomer M-1, and 0.18 g (1.1 mmol) of 2,2'-azoiso(butyronitrile) (product of Tokyo Chemical Industry Co., Ltd.) in 20 mL of methyl ethyl ketone was added dropwise for 1.5 hours, and then the resultant solution was stirred at 75 degrees Celsius for 6 hours. The resultant solution was cooled to room temperature (25 degrees Celsius), and the obtained reaction solution was charged into hexane. The precipitated copolymer was filtrated and was dried under reduced pressure, to obtain 5.65 g of copolymer CP-1 (weight average molecular weight (Mw): 11,000, number average molecular weight (Mn): 6,500). A spectrum of the copolymer CP-1 obtained in Example 1 is given in FIG. 3.

Next, 2.00 g of the obtained copolymer CP-1 was dissolved in an aqueous solution of tetraethylammonium hydroxide so that a concentration of the copolymer was 2.38% and that a pH of the aqueous solution was 8.0, to obtain an aqueous solution of copolymer CP-1 for dispersing pigment.

Example 2: Synthesis of Copolymer CP-2

First, 15.6 g (252 mmol) of ethylene glycol was dissolved in 100 mL of methylene chloride, and 3.49 g (44 mmol) of pyridine was added thereto, followed by cooling the solution with ice water. To the aforementioned solution, a solution obtained by dissolving 8.00 g (42 mmol) of 2-naphthalene carbonyl chloride in 80 mL of methylene chloride was added dropwise, while stirring for 1 hour. Then, the resultant solution was stirred for 2 hours, and further stirred for 6 hours at room temperature (25 degrees Celsius). The obtained reaction solution was washed with water to isolate an organic phase. Then, the organic phase was dried with magnesium sulfate to remove the solvent. The residue was purified by silica gel column chromatography using a mixture solvent of methylene chloride/methanol (volume ratio: 97/3) as an eluent, to obtain 6.88 g of 2-naphthoic acid-2-hydroxy ethyl ester.

The obtained 2-naphthoic acid-2-hydroxy ethyl ester and 2-methacryloyloxyethyl isocyanate (KARENZ MOI, product of Showa Denko K.K.) were used to obtain monomer M-2 having a structure expressed by the following Structural Formula (3-2) in the same manner as in Example 1.

(Chem. 14)

Structural Formula (3-2)

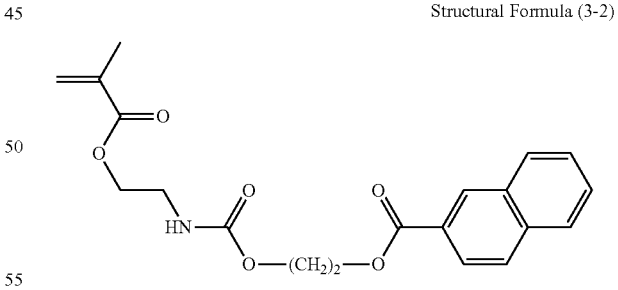

Next, 0.80 g (6.9 mmol) of maleic acid (product of Tokyo Chemical Industry Co., Ltd.) was dissolved in 5 mL of methyl ethyl ketone, and the resultant solution was heated to 75 degrees Celsius under an argon stream. To the aforementioned solution, a solution obtained by dissolving 0.72 g (6.9 mmol) of stylene (product of Wako Pure Chemical Industries, Ltd.), 4.29 g (8.6 mmol) of the monomer M-2, and 0.15 g (0.9 mmol) of 2,2'-azoiso(butyronitrile) (product of Tokyo Chemical Industry Co., Ltd.) in 20 mL of methyl ethyl ketone was added dropwise for 1.5 hours, followed by stirring at 75 degrees Celsius for 6 hours. The resultant solution was cooled to room temperature (25 degrees Celsius), and the obtained reaction solution was charged into hexane. The precipitated copolymer was filtrated and was dried under reduced pressure, to obtain 5.45 g of copolymer CP-2 (weight average molecular weight (Mw): 10,000, number average molecular weight (Mn): 6,000).

An IR spectrum of the copolymer CP-2 obtained in Example 2 was similar to the IR spectrum of the copolymer CP-1 obtained in Example 1.

Next, 2.00 g of the obtained copolymer CP-2 was dissolved in an aqueous solution of tetraethylammonium hydroxide so that a concentration of the copolymer was 2.38% and that a pH of the aqueous solution was 8.0, to obtain an aqueous solution of copolymer CP-2 for dispersing pigment.

Example 3: Synthesis of Copolymer CP-3

First, 25.5 g (126 mmol) of dodecane-1.12-diol was dissolved in 100 mL of methylene chloride, and 3.32 g (42 mmol) of pyridine was added thereto, followed by cooling with ice water. To the aforementioned solution (80 mL), a solution obtained by dissolving 8.00 g (42 mmol) of 2-naphthalene carbonyl chloride in 80 mL of methyl chloride was added dropwise, while stirring for 1 hour. Then, the resultant solution was stirred for 2 hours, and was further stirred for 6 hours at room temperature (25 degrees Celsius). The obtained reaction solution was washed with water, to isolate an organic phase. Then, the organic phase was dried with magnesium sulfate to remove the solvent. The residue was purified by silica gel column chromatography using a mixture solvent of methylene chloride/methanol (volume ratio: 97/3) as an eluent, to obtain 8.96 g of 2-naphthoic acid-12-hydroxy dodecyl ester.

The obtained 2-naphthoic acid-12-hydroxy dodecyl ester and 2-acryloyloxyethyl isocyanate (KARENZ AOI, product of Showa Denko K.K.) were used to obtain monomer M-3 having a structure expressed by the following Structural Formula (3-3) in the same manner as in Example 1.

(Chem. 15)

Structural Formula (3-3)

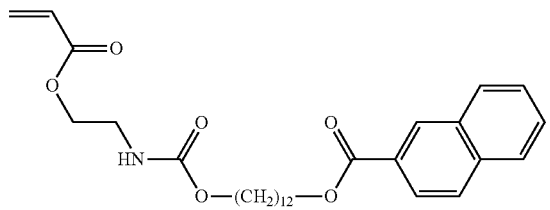

Next, 0.80 g (6.9 mmol) of maleic acid (product of Tokyo Chemical Industry Co., Ltd.) was dissolved in 5 mL of methyl ethyl ketone, and the resultant solution was heated to 75 degrees Celsius under an argon stream. To the aforementioned solution, a solution obtained by dissolving 0.72 g (6.9 mmol) of stylene (product of Wako Pure Chemical Industries, Ltd.), 4.41 g (8.6 mmol) of the monomer M-3, and 0.15 g (0.9 mmol) of 2,2'-azoiso(butyronitrile) (product of Tokyo Chemical Industry Co., Ltd.) in 20 mL of methyl ethyl ketone was added dropwise for 1.5 hours, followed by stirring at 75 degrees Celsius for 6 hours. The resultant solution was cooled to room temperature (25 degrees Celsius), and the obtained reaction solution was charged into hexane. The precipitated copolymer was filtrated and was dried under reduced pressure, to obtain 5.62 g of copolymer CP-3 (weight average molecular weight (Mw): 12,000, number average molecular weight (Mn): 7,500).

An IR spectrum of the copolymer CP-3 obtained in Example 3 was similar to the IR spectrum of the copolymer CP-1 obtained in Example 1.

Next, 2.00 g of the obtained copolymer CP-3 was dissolved in an aqueous solution of tetraethylammonium hydroxide so that a concentration of the copolymer was 2.38% and that a pH of the aqueous solution was 8.0, to obtain an aqueous solution of copolymer CP-3 for dispersing pigment.

Example 4: Synthesis of Copolymer CP-4

First, 10.00 g (39 mmol) of hexadecane-1.16-diol was dissolved in 100 mL of methylene chloride, and 1.54 g (19 mmol) of pyridine was added thereto, followed by cooling with ice water. To the aforementioned solution, a solution obtained by dissolving 3.70 g (19 mmol) of 2-naphthalene carbonyl chloride in 80 mL of methylene chloride wad added dropwise, while stirring for 1 hour. The resultant solution was stirred for 2 hours, and was further stirred for 6 hours at room temperature (25 degrees Celsius). The obtained reaction solution was washed with water to isolate an organic phase. Then, the organic phase was dried with magnesium sulfate to remove the solvent. The residue was purified by silica gel column chromatography using a mixture solvent of methylene chloride/methanol (volume ratio: 97/3) as an eluent, to obtain 6.90 g of 2-naphthoic acid-16-hydroxy hexadodecyl ester.

The obtained 2-naphthoic acid-16-hydroxy hexadodecyl ester and 2-methacryloyloxyethyl isocyanate (KARENZ MOI, product of Showa Denko K.K.) were used to obtain monomer M-4 having a structure expressed by the following Structural Formula (3-4) in the same manner as in Example 1.

(Chem. 16)

Structural Formula (3-4)

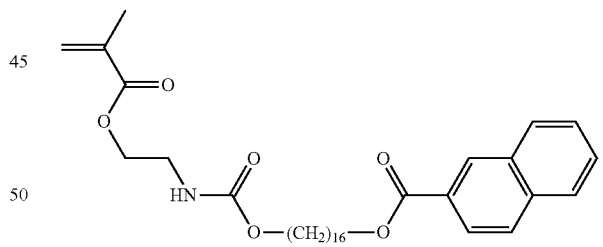

Next, 0.75 g (6.5 mmol) of maleic acid (product of Tokyo Chemical Industry Co., Ltd.) was dissolved in 5 mL of methyl ethyl ketone, and the resultant solution was heated to 75 degrees Celsius under an argon stream. To the aforementioned solution, a solution obtained by dissolving 0.67 g (6.5 mmol) of stylene (product of Wako Pure Chemical Industries, Ltd.), 4.59 g (8.1 mmol) of the monomer M-4, and 0.14 g (0.8 mmol) of 2,2'-azoiso(butyronitrile) (product of Tokyo Chemical Industry Co., Ltd.) in 20 mL of methyl ethyl ketone was added dropwise for 1.5 hours, followed by stirring at 75 degrees Celsius for 6 hours. The resultant solution was cooled to room temperature (25 degrees Celsius), and the obtained reaction solution was charged into hexane. The precipitated copolymer was filtrated and was dried under reduced pressure, to obtain 5.85 g of copolymer CP-4 (weight average molecular weight (Mw): 13,000, number average molecular weight (Mn): 8,000).

An IR spectrum of the copolymer CP-4 obtained in Example 4 was similar to the IR spectrum of the copolymer CP-1 obtained in Example 1.

Next, 2.00 g of the obtained copolymer CP-4 was dissolved in an aqueous solution of tetraethylammonium hydroxide so that a concentration of the copolymer was 2.38% and that a pH of the aqueous solution was 8.0, to obtain an aqueous solution of copolymer CP-4 for dispersing pigment.

Example 5: Synthesis of Copolymer CP-5

First, 0.70 g (6.0 mmol) of maleic acid (product of Tokyo Chemical Industry Co., Ltd.) was dissolved in 5 mL of methyl ethyl ketone, and the resultant solution was heated to 75 degrees Celsius under an argon stream. To the aforementioned solution, a solution obtained by dissolving 0.63 g (6.0 mmol) of stylene (product of Wako Pure Chemical Industries, Ltd.), 4.30 g (10.0 mmol) of the monomer M-1, and 0.15 g (0.09 mmol) of 2,2'-azoiso(butyronitrile) (product of Tokyo Chemical Industry Co., Ltd.) in 20 mL of methyl ethyl ketone was added dropwise for 1.5 hours, followed by stirring at 75 degrees Celsius for 6 hours. The resultant solution was cooled to room temperature (25 degrees Celsius), and the obtained reaction solution was charged into hexane. The precipitated copolymer was filtrated and dried under reduced pressure, to obtain 5.28 g of copolymer CP-5 (weight average molecular weight (Mw): 12,000, number average molecular weight (Mn): 7,000).

An IR spectrum of the copolymer CP-5 obtained in Example 5 was similar to the IR spectrum of the copolymer CP-1 obtained in Example 1.

Next, 2.00 g of the obtained copolymer CP-5 was dissolved in an aqueous solution of tetraethylammonium hydroxide so that a concentration of the copolymer was 2.38% and that a pH of the aqueous solution was 8.0, to obtain an aqueous solution of copolymer CP-5 for dispersing pigment.

Example 6: Synthesis of Copolymer CP-6

First, 1.40 g (12.1 mmol) of maleic acid (product of Tokyo Chemical Industry Co., Ltd.) was dissolved in 5 mL of methyl ethyl ketone, and the resultant solution was heated to 75 degrees Celsius under an argon stream. To the aforementioned solution, a solution obtained by dissolving 1.26 g (12.1 mmol) of stylene (product of Wako Pure Chemical Industries, Ltd.), 3.44 g (8.0 mmol) of the monomer M-1, and 0.18 g (1.1 mmol) of 2,2'-azoiso(butyronitrile) (product of Tokyo Chemical Industry Co., Ltd.) in 20 mL of methyl ethyl ketone was added dropwise for 1.5 hours, followed by stirring at 75 degrees Celsius for 6 hours. The resultant solution was cooled to room temperature (25 degrees Celsius), and the obtained reaction solution was charged into hexane. The precipitated copolymer was filtrated and dried under reduced pressure, to obtain 6.05 g of copolymer CP-6 (weight average molecular weight (Mw): 11,000, number average molecular weight (Mn): 6,500). An IR spectrum of the copolymer CP-6 obtained in Example 6 is given in FIG. 4.

Next, 2.00 g of the obtained copolymer CP-6 was dissolved in an aqueous solution of tetraethylammonium hydroxide so that a concentration of the copolymer was 2.38% and that a pH of the aqueous solution was 8.0, to obtain an aqueous solution of copolymer CP-6 for dispersing pigment.

Example 7: Synthesis of Copolymer CP-7

First, 0.90 g (7.8 mmol) of maleic acid (product of Tokyo Chemical Industry Co., Ltd.) was dissolved in 5 mL of methyl ethyl ketone, and the resultant solution was heated to 75 degrees Celsius under an argon stream. To the aforementioned solution, a solution obtained by dissolving 1.62 g (15.5 mmol) of stylene (product of Wako Pure Chemical Industries, Ltd.), 3.32 g (7.8 mmol) of the monomer M-1, and 0.20 g (1.2 mmol) of 2,2'-azoiso(butyronitrile) (product of Tokyo Chemical Industry Co., Ltd.) in 20 mL of methyl ethyl ketone was added dropwise for 1.5 hours, followed by stirring at 75 degrees Celsius for 6 hours. The resultant solution was cooled to room temperature (25 degrees Celsius), and then the obtained reaction solution was charged into hexane. The precipitated copolymer was filtrated and dried under reduced pressure, to obtain 5.34 g of copolymer CP-7 (weight average molecular weight (Mw): 12,000, number average molecular weight (Mn): 7,000).

An IR spectrum of the copolymer CP-7 obtained in Example 7 was similar to the IR spectrum of the copolymer CP-6 obtained in Example 6.

Next, 2.00 g of the obtained copolymer CP-7 was dissolved in an aqueous solution of tetraethylammonium hydroxide so that a concentration of the copolymer was 2.38% and that a pH of the aqueous solution was 8.0, to obtain an aqueous solution of copolymer CP-7 for dispersing pigment.

Example 8: Synthesis of Copolymer CP-8

First, 1.60 g (13.8 mmol) of maleic acid (product of Tokyo Chemical Industry Co., Ltd.) was dissolved in 5 mL of methyl ethyl ketone, and the resultant solution was heated to 75 degrees Celsius under an argon stream. To the aforementioned solution, a solution obtained by dissolving 1.44 g (13.8 mmol) of stylene (product of Wako Pure Chemical Industries, Ltd.), 2.95 g (6.9 mmol) of the monomer M-1, and 0.23 g (1.4 mmol) of 2,2'-azoiso(butyronitrile) (product of Tokyo Chemical Industry Co., Ltd.) in 20 mL of methyl ethyl ketone was added dropwise for 1.5 hours, followed by stirring at 75 degrees Celsius for 6 hours. The resultant solution was cooled to room temperature (25 degrees Celsius), and the obtained reaction solution was charged into hexane. The precipitated copolymer was filtrated and dried under reduced pressure, to obtain 5.99 g of copolymer CP-8 (weight average molecular weight (Mw): 11,000, number average molecular weight (Mn): 6,000).

An IR spectrum of the copolymer CP-8 obtained in Example 8 was similar to the IR spectrum of the copolymer CP-6 obtained in Example 6.

Next, 2.00 g of the obtained copolymer CP-8 was dissolved in an aqueous solution of sodium hydroxide so that a concentration of the copolymer was 2.38% and that a pH of the aqueous solution was 8.0, to obtain an aqueous solution of copolymer CP-8 for dispersing pigment.

Example 9: Synthesis of Copolymer CP-9

First, 1.80 g (15.5 mmol) of maleic acid (product of Tokyo Chemical Industry Co., Ltd.) and 2.94 g (5.2 mmol) of the monomer M-4 were dissolved in 20 mL of methyl ethyl ketone, and the resultant solution was heated to 75 degrees Celsius under an argon stream. To the aforementioned solution, a monomer solution obtained by dissolving 1.62 g (15.5 mmol) of stylene (product of Wako Pure Chemical Industries, Ltd.) in 0.24 g (1.5 mmol) of 2,2'-azoiso(butyronitrile) (product of Tokyo Chemical Industry Co., Ltd.) was added dropwise for 0.5 hours, followed by stirring at 75 degrees Celsius for 6 hours. The resultant solution was cooled to room temperature (25 degrees Celsius), and the obtained reaction solution was charged into hexane.

The precipitated copolymer was filtrated and dried under reduced pressure, to obtain 5.99 g of copolymer CP-9 (weight average molecular weight (Mw): 13,000, number average molecular weight (Mn): 9,000). An IR spectrum of the copolymer CP-9 obtained in Example 9 is given in FIG. 5.

Next, 2.00 g of the obtained copolymer CP-9 was dissolved in an aqueous solution of sodium hydroxide so that a concentration of the copolymer was 2.38% and that a pH of the aqueous solution was 8.0, to obtain an aqueous solution of copolymer CP-9 for dispersing pigment.

Example 10: Synthesis of Copolymer CP-10

First, 25.00 g (173 mmol) of 2-naphthol was dissolved in 200 mL of dry methylene chloride, and the resultant solution was heated to 40 degrees Celsius. To the aforementioned solution, a mixture of 29.60 g (191 mmol) of 2-acryloyloxyethyl isocyanate (KARENZ MOI, product of Showa Denko K.K.) and 0.03 g of dibutyltin dilaurate was added dropwise, while stirring for 30 minutes, followed by stirring at 40 degrees Celsius for 5 hours. The resultant mixture was cooled to room temperature (25 degrees Celsius), and 3 g of QuadraSil MP (product of Wako Pure Chemical Industries, Ltd.) was added thereto. The resultant mixture was stirred for 10 minutes, and was filtrated, followed by removing the solvent in the filtration. The residue was purified through recrystallization using a mixture solvent of toluene/ethyl acetate (volume ratio: 9/1), to obtain 35.09 g of monomer M-5 having a structure expressed by the following Structural Formula (3-5).

(Chem. 17)

Structural Formula (3-5)

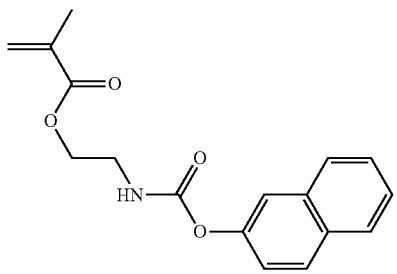

First, 1.30 g (11.2 mmol) of maleic acid (product of Tokyo Chemical Industry Co., Ltd.) was dissolved in 5 mL of methyl ethyl ketone, and the resultant solution was heated to 75 degrees Celsius under an argon stream. To the aforementioned solution, a solution obtained by 1.17 g (11.2 mmol) of stylene (product of Wako Pure Chemical Industries, Ltd.), 3.35 g (11.2 mmol) of the monomer M-5, and 0.28 g (1.7 mmol) of 2,2'-azoiso(butyronitrile) (product of Tokyo Chemical Industry Co., Ltd.) in 20 mL of methyl ethyl ketone was added dropwise for 1.5 hours, followed by stirring at 75 degrees Celsius for 6 hours. The resultant solution was cooled to room temperature (25 degrees Celsius) and the obtained reaction solution was charged into hexane. The precipitated copolymer was filtrated and dried under reduced pressure, to obtain 5.76 g of copolymer CP-10 (weight average molecular weight (Mw): 11,000, number average molecular weight (Mn): 6,000).

An IR spectrum of the copolymer CP-10 obtained in Example 10 was similar to the IR spectrum of the copolymer CP-1 obtained in Example 1.

Next, 2.00 g of the obtained copolymer CP-10 was dissolved in an aqueous solution of tetraethylammonium hydroxide so that a concentration of the copolymer was 2.38% and that a pH of the aqueous solution was 8.0, to obtain an aqueous solution of copolymer CP-10 for dispersing pigment.

Example 11: Synthesis of Copolymer CP-11

First, 40.51 g (94.8 mmol) of the monomer M-1 and 1.10 g (9.5 mmol) of maleic acid (product of Tokyo Chemical Industry Co., Ltd.) were dissolved in 19.0 g (180 mmol) of stylene (product of Wako Pure Chemical Industries, Ltd.). Then, 100 g of ion-exchanged water, 3.00 g of AQUALON KH-10 (radical reactive, anionic surfactant, product of DKS Co. Ltd.), and 1.00 g of ammonium persulfate were added thereto, to form pre-emulsion using a homomixer. Next, 2.00 g of AQUALON KH-10 was added to 100 g of ion-exchanged water, and the resultant solution was heated to 80 degrees Celsius under an argon stream. Then, 10% of the obtained pre-emulsion was added thereto, and the resultant solution was subjected to the initial polymerization for 30 minutes.

Next, the remaining pre-emulsion was allowed to polymerize while added dropwise to the aforementioned solution for 2 hours, followed by polymerizing at 80 degrees Celsius for 2 hours. After cooling, the resultant solution was filtrated, and was neutralized with an aqueous ammonium solution, to obtain an O/W emulsion of copolymer CP-11 (weight average molecular weight (Mw): 24,000, number average molecular weight (Mn): 12,000) having a solid content of 30% to be added.

Example 12: Synthesis of Copolymer CP-12

First, 34.99 g (81.9 mmol) of the monomer M-1 and 0.95 g (8.2 mmol) of maleic acid (product of Tokyo Chemical Industry Co., Ltd.) were dissolved in 25.0 g (237 mmol) of stylene (product of Wako Pure Chemical Industries, Ltd.), and 100 g of ion-exchanged water, 3.00 g of AQUALON KH-10 (radical reactive, anionic surfactant, product of DKS Co. Ltd.), and 1.00 g of ammonium persulfate were added thereto, to form pre-emulsion using a homomixer. Next, 2.00 g of AQUALON KH-10 was added to 100 g of ion-exchanged water, and the resultant solution was heated to 80 degrees Celsius under an argon stream. Then, 10% of the obtained pre-emulsion was added thereto, and the resultant solution was subjected to the initial polymerization for 30 minutes.

Next, the remaining pre-emulsion was allowed to polymerize while added dropwise to the aforementioned solution for 2 hours, followed by further polymerizing at 80 degrees Celsius for 2 hours. After cooling, the resultant solution was filtrated, and was neutralized with an aqueous ammonium solution, to obtain an O/W emulsion of copolymer CP-12

(weight average molecular weight (Mw): 21,000, number average molecular weight (Mn): 9,500) having a solid content of 30% to be added.

Structures and properties of the copolymers obtained in the above Examples 1 to 12 are summarized and given in Tables 1 and 2.

TABLE 1

| | Co-polymer | Monomer | R | X | L |
|---|---|---|---|---|---|
| Example 1 | CP-1 | M-1 | $CH_3$ | TEA | $-(CH_2)_6-O-CO-$ |
| Example 2 | CP-2 | M-2 | $CH_3$ | TEA | $-(CH_2)_2-O-CO-$ |
| Example 3 | CP-3 | M-3 | H | TEA | $-(CH_2)_{12}-O-CO-$ |
| Example 4 | CP-4 | M-4 | $CH_3$ | TEA | $-(CH_2)_{16}-O-CO-$ |
| Example 5 | CP-5 | M-1 | $CH_3$ | TEA | $-(CH_2)_6-O-CO-$ |
| Example 6 | CP-6 | M-1 | $CH_3$ | TEA | $-(CH_2)_6-O-CO-$ |
| Example 7 | CP-7 | M-1 | $CH_3$ | TEA | $-(CH_2)_6-O-CO-$ |
| Example 8 | CP-8 | M-1 | $CH_3$ | $Na^+$ | $-(CH_2)_6-O-CO-$ |
| Example 9 | CP-9 | M-4 | $CH_3$ | $Na^+$ | $-(CH_2)_{16}-O-CO-$ |
| Example 10 | CP-10 | M-5 | $CH_3$ | TEA | Single bond |
| Example 11 | CP-11 | M-1 | $CH_3$ | TEA | $-(CH_2)_6-O-CO-$ |
| Example 12 | CP-12 | M-1 | $CH_3$ | TEA | $-(CH_2)_6-O-CO-$ |

*TEA represents a tetraethylammonium ion.

TABLE 2

| | Structural unit of General Formula (1) (mol %) | Structural unit of Structural Formula (1) (mol %) | Structural unit of General Formula (2) (mol %) | (1):(2):(3) (Molar ratio) | Weight average molecular weight Mw | Number average molecular weight Mn |
|---|---|---|---|---|---|---|
| Example 1 | 30.7 | 30.7 | 38.6 | 0.8:0.8:1 | 11,000 | 6,500 |
| Example 2 | 30.7 | 30.7 | 38.6 | 0.8:0.8:1 | 10,000 | 6,000 |
| Example 3 | 30.7 | 30.7 | 38.6 | 0.8:0.8:1 | 12,000 | 7,500 |
| Example 4 | 30.7 | 30.7 | 38.6 | 0.8:0.8:1 | 13,000 | 8,000 |
| Example 5 | 27.3 | 27.3 | 45.4 | 0.6:0.6:1 | 12,000 | 7,000 |
| Example 6 | 37.5 | 37.5 | 25.0 | 1.5:1.5:1 | 11,000 | 6,500 |
| Example 7 | 25.0 | 50.0 | 25.0 | 1:02:01 | 12,000 | 7,000 |
| Example 8 | 40.0 | 40.0 | 20.0 | 2:02:01 | 11,000 | 6,000 |
| Example 9 | 42.9 | 42.9 | 14.2 | 3:03:01 | 13,000 | 9,000 |
| Example 10 | 33.3 | 33.3 | 33.3 | 1:01:01 | 11,000 | 6,000 |
| Example 11 | 3.3 | 63.3 | 33.3 | 0.1:1.9:1 | 24,000 | 12,000 |
| Example 12 | 2.5 | 72.5 | 25.0 | 0.1:2.9:1 | 21,000 | 9,500 |

Example 21; Preparation of Aqueous Ink GJ-1

(Preparation of Pigment Dispersion Element PD-1)

To the aqueous solution of copolymer CP-1 prepared in Example 1 (84.0 parts), 16.0 parts of carbon black (NIPEX150, product of Degussa) was added, followed by stirring for 12 hours. The obtained mixture was subjected to circulation dispersion for 1 hour using a disc-type beads mill (KDL-type, media: zirconia balls having a diameter of 0.1 mm, product of SHINMARU ENTERPRISES CORPORATION) at a peripheral speed of 10 m/s, and was filtrated through a membrane filter having a pore diameter of 1.2 micro meters. Then, ion-exchanged water was added thereto for adjustment, to obtain 95.0 parts of pigment dispersing element PD-1 (solid content concentration of pigment: 16%).

(Preparation of Ink)

The pigment dispersing element PD-1 (45.0 parts), 10.0 parts of 1,3-butanediol, 10.0 parts of glycerin, 10.0 parts of 3-methoxy-N,N-dimethyl propionamide, 1.0 part of ZONYL FS-300 (product of DuPont, fluorine surfactant, 40% of solid content), and 24.0 parts of ion-exchanged water were mixed, stirred for 1 hour, and filtrated through a membrane filter having a pore diameter of 1.2 micro meters, to obtain aqueous ink GJ-1 of Example 21.

Example 22; Preparation of Aqueous Ink GJ-2

Pigment dispersing element PD-2 was obtained in the same manner as in Example 21 except that the aqueous solution of copolymer CP-1 was changed to the aqueous solution of copolymer CP-2.

Aqueous ink GJ-2 of Example 22 was obtained in the same manner as in Example 21 except that the pigment dispersing element PD-1 was changed to the obtained pigment dispersing element PD-2.

Example 23; Preparation of Aqueous Ink GJ-3

Pigment dispersing element PD-3 was obtained in the same manner as in Example 21 except that the aqueous solution of copolymer CP-1 was changed to the aqueous solution of copolymer CP-3.

Aqueous ink GJ-3 of Example 23 was obtained in the same manner as in Example 21 except that the pigment dispersing element PD-1 was changed to the obtained pigment dispersing element PD-3.

Example 24; Preparation of Aqueous Ink GJ-4

Pigment dispersing element PD-4 was obtained in the same manner as in Example 21 except that the aqueous solution of copolymer CP-1 was changed to the aqueous solution of copolymer CP-4.

Aqueous ink GJ-4 of Example 24 was obtained in the same manner as in Example 21 except that the pigment dispersing element PD-1 was changed to the obtained pigment dispersing element PD-4

Example 25; Preparation of Aqueous Ink GJ-5

Pigment dispersing element PD-5 was obtained in the same manner as in Example 21 except that the aqueous solution of copolymer CP-1 was changed to the aqueous solution of copolymer CP-5.

Aqueous ink GJ-5 of Example 25 was obtained in the same manner as in Example 21 except that the pigment dispersing element PD-1 was changed to the obtained pigment dispersing element PD-5.

Example 26; Preparation of Aqueous Ink GJ-6

Pigment dispersing element PD-6 was obtained in the same manner as in Example 21 except that the aqueous solution of copolymer CP-1 was changed to the aqueous solution of copolymer CP-6.

Aqueous ink GJ-6 of Example 26 was obtained in the same manner as in Example 21 except that the pigment dispersing element PD-1 was changed to the obtained pigment dispersing element PD-6.

Example 27; Preparation of Aqueous Ink GJ-7

Pigment dispersing element PD-7 was obtained in the same manner as in Example 21 except that the aqueous solution of copolymer CP-1 was changed to the aqueous solution of copolymer CP-7.

Aqueous ink GJ-7 of Example 27 was obtained in the same manner as in Example 21 except that the pigment dispersing element PD-1 was changed to the obtained pigment dispersing element PD-7.

Example 28; Preparation of Aqueous Ink GJ-8

Pigment dispersing element PD-8 was obtained in the same manner as in Example 21 except that the aqueous solution of copolymer CP-1 was changed to the aqueous solution of copolymer CP-8.

Aqueous ink GJ-8 of Example 28 was obtained in the same manner as in Example 21 except that the pigment dispersing element PD-1 was changed to the obtained pigment dispersing element PD-8.

Example 29; Preparation of Aqueous Ink GJ-9

Pigment dispersing element PD-9 was obtained in the same manner as in Example 21 except that the aqueous solution of copolymer CP-1 was changed to the aqueous solution of copolymer CP-9.

Aqueous ink GJ-9 of Example 29 was obtained in the same manner as in Example 21 except that the pigment dispersing element PD-1 was changed to the obtained pigment dispersing element PD-9.

Example 30; Preparation of Aqueous Ink GJ-10

Pigment dispersing element PD-10 was obtained in the same manner as in Example 21 except that the aqueous solution of copolymer CP-1 was changed to the aqueous solution of copolymer CP-10.

Aqueous ink GJ-10 of Example 30 was obtained in the same manner as in Example 21 except that the pigment dispersing element PD-1 was changed to the obtained pigment dispersing element PD-10.

Example 31; Preparation of Aqueous Ink GJ-11

Pigment dispersing element PD-11 was obtained in the same manner as in Example 21 except that carbon black (NIPEX150, product of Degussa) used in the preparation of pigment dispersing elements was changed to Pigment Blue 15:3 (CHROMOFINE BLUE cyan pigment, product of Dainichiseika Color & Chemicals Mfg. Co., Ltd.), and that a solid content concentration was changed to 20.0%.

Next, 30.0 parts of the pigment dispersing element PD-11, 15.0 parts of 1,3-butanediol, 10.0 parts of glycerin, 20.0 parts of 3-methoxy-N,N-dimethyl propionamide, 1.0 part of ZONYL FS-300 (product of DuPont, fluorine surfactant, 40% of solid content), and 24.0 parts of ion-exchanged water were mixed and stirred for 1 hour, and then the resultant mixture was caused to pass through a membrane filter having a pore diameter of 1.2 micro meters, to obtain aqueous ink GJ-11 of Example 31.

Example 32; Preparation of Aqueous Ink GJ-12

Pigment dispersing element PD-12 was obtained in the same manner as in Example 21 except that carbon black (NIPEX 150, product of Degussa) used in the preparation of pigment dispersing element was changed to Pigment Red 122 (product of Clariant (Japan) K.K., toner magenta EO02 magenta pigment), and that a solid content concentration was changed to 20.0%.

Aqueous ink GJ-12 of Example 32 was obtained in the same manner as in Example 21 except that the pigment dispersing element PD-1 was changed to the obtained pigment dispersing element PD-12.

Example 33; Preparation of Aqueous Ink GJ-13

Pigment dispersing element PD-13 was obtained in the same manner as in Example 21 except that carbon black (NIPEX150, product of Degussa) used in the preparation of pigment dispersing element was changed to Pigment Yellow (Dainichiseika Color & Chemicals Mfg. Co., Ltd., FAST YELLOW 531 yellow pigment), and that a solid content concentration was changed to 20.0%.

Aqueous ink GJ-13 was obtained in the same manner as in Example 31 except that the pigment dispersing element PD-11 was changed to the obtained pigment dispersing element PD-13 of Example 33.

Example 34; Preparation of Aqueous Ink GJ-14

(Preparation of pigment dispersing element CB-K)

The following materials were mixed and stirred for 30 minutes, to prepare aqueous solution 1.

2-Ethyl-1,3-hexanediol 2.00 parts

Glycerol 10.00 parts

3-Methoxy-N,N-dimethyl propanamide 15.00 parts

3-Butoxy-N,N-dimethyl propanamide 15.00 parts 2-(Cyclohexylamino)ethanesulfonic acid 0.05 parts 2,4,7,9-Tetramethyl-4,7-decanediol 0.50 parts ZONYL FS-300 (product of DuPont, fluorine surfactant) 0.25 parts Diethanol amine 0.01 parts Ion-exchanged water 12.93 parts Next, 50 g of dry carbon black (NIPEX150, product of Degussa), 100 mL of ion-exchanged water, and 15.5 g (50 mmol) of a compound expressed by the following Structural Formula (4) were mixed and heated to 60 degrees Celsius while stirring the mixture at 300 rpm. Then, 20% aqueous solution of sodium nitrite (50 mmol) was added thereto for 15 minutes, followed by stirring at 60 degrees Celsius for 3 hours. The resultant mixture was diluted in 75 mL of ion-exchanged water, and the resultant solution was filtrated. Then, ion-exchanged water was added thereto so that a solid content concentration in the solution was 20.0%, to obtain carbon black pigment dispersing element CB-K.

(Chem. 18)

Structural Formula (4)

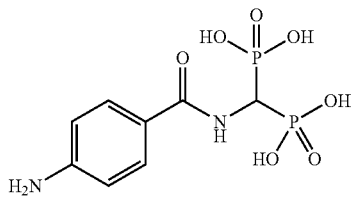

Next, 37.50 parts of the pigment dispersing element CB-K was added to the aqueous solution 1, followed by stirring the resultant solution for 30 minutes. Moreover, 6.67 parts of the copolymer CP-11 (solid content concentration: 30%) was added thereto and stirred for 30 minutes. Next, the resultant solution was filtrated through a membrane filter having a pore diameter of 1.2 micro meters, to obtain aqueous ink GJ-14 of Example 34.

Example 35; Preparation of Aqueous Ink GJ-15

(Preparation of Pigment Dispersing Element CB-C)
The following materials were mixed and stirred for 30 minutes, to prepare aqueous solution 2.
2-Ethyl-1,3-hexanediol 2.00 parts
Glycerol 10.00 parts
3-Methoxy-N,N-dimethyl propanamide 20.00 parts
3-Butoxy-N,N-dimethyl propanamide 20.00 parts
2-(Cyclohexylamino)ethanesulfonic acid 0.05 parts
2,4,7,9-Tetramethyl-4,7-decanediol 0.50 parts
ZONYL FS-300 (fluorine surfactant, product of DuPont) 0.25 parts
Diethanol amine 0.01 parts
Ion-exchanged water 17.93 parts Next, 4.50 g of p-aminobenzoic acid was added to 150 g of ion-exchanged water heated to 60 degrees Celsius, followed by mixing at 8,000 rpm for 10 minutes. To the aforementioned mixture, a solution obtained by dissolving 1.80 g of sodium nitrite in 15 g of ion-exchanged water was added, immediately after that, 20 g of copper phthalocyanine pigment PB15:4 (product of Sun Chemical) was added thereto, followed by mixing for 1 hour at 8,500 rpm. Moreover, to the aforementioned solution, a solution obtained by dissolving 4.5 g of p-aminobenzoic acid in 15 g of ion-exchanged water was added, followed by mixing at 8,500 rpm and 65 degrees Celsius for 3 hours. The obtained reaction solution was filtrated through a mesh (200 nm), and was washed with water. Then, the obtained cyan pigment was dispersed in water. The dispersed solution was subjected to centrifugation to remove coarse particles. Then, ion-exchanged water was added to the resultant solution so that a solid content concentration was 20.0%, to obtain cyan pigment dispersing element CB-C, which had undergone the surface treatment with p-aminobenzoic acid.

Next, 22.50 parts of the pigment dispersing element CB-C was added to the aqueous solution 2, followed by stirring for 30 minutes. Additionally, 6.67 parts of the copolymer CP-12 (solid content concentration: 30%) was added thereto, and the resultant solution was stirred for 30 minutes.

Next, the resultant solution was filtrated through a membrane filter having a pore diameter of 1.2 micro meters, to obtain aqueous ink GJ-15 of Example 35.

Example 36; Preparation of Aqueous Ink GJ-16

(Preparation of Magenta Pigment Dispersing Element CB-M)
Aqueous solution 1 was prepared in the same manner as in Example 34.

Next, 4.50 g of sulfanilic acid was added to 150 g of ion-exchanged water heated to 60 degrees Celsius, followed by mixing at 8,000 rpm for 10 minutes. To the aforementioned mixture, a solution obtained by dissolving 1.80 g of sodium nitrite in 15 g of ion-exchanged water was added, immediately after that, 20 g of magenta pigment PR122 (product of Sun Chemical) was added, followed by mixing at 8,500 rpm for 1 hours. Moreover, to the resultant solution, a solution obtained by dissolving 4.5 g of sulfanilic acid in 15 g of ion-exchanged water was added thereto, followed by mixing at 8,500 rpm and 65 degrees Celsius for 3 hours. The obtained reaction mixture was filtrated through a mesh (200 nm), and washed with water. Then, the obtained magenta pigment was dispersed in water. The dispersed solution was subjected to centrifugation to remove coarse particles. Then, ion-exchanged water was added to the resultant solution so that a solid content concentration was 20.0%, to obtain magenta pigment dispersing element CB-M, which had undergone the surface treatment with sulfanilic acid.

Next, 37.50 parts of the pigment dispersing element CB-M was added to the aqueous solution 1, followed by stirring for 30 minutes. Moreover, 6.67 parts of the copolymer CP-12 (solid content concentration: 30%) was added thereto, followed by stirring for 30 minutes.

Then, the resultant solution was filtrated through a membrane filter having a pore diameter of 1.2 micro meters, to obtain aqueous ink GJ-16 of Example 36.

Example 37; Preparation of Aqueous Ink GJ-17

Aqueous solution 2 was prepared in the same manner as in Example 35, and then 22.50 parts of the cyan pigment dispersing element PD-11 (solid content: 20.0%) was added to the aqueous solution 2 prepared in Example 31. Then, the resultant solution was stirred for 30 minutes, and 6.67 parts of the copolymer CP-12 (solid content concentration: 30%) was added thereto, followed by stirring for 30 minutes. Next, the resultant solution was filtrated through a membrane filter having a pore diameter of 1.2 micro meters, to obtain aqueous ink GJ-17 of Example 37.

Comparative Example 1; Preparation of Comparative Aqueous Ink RGJ-1

In 30 mL of dry methylene chloride, 10.73 g (105 mmol) of 1-hexanol was dissolved, and the resultant solution was heated to 40 degrees Celsius. To the aforementioned solution, 15.51 g (100 mmol) of 2-acryloyloxyethyl isocyanate (KARENZ MOI, product of Showa Denko K.K.) was added dropwise, while stirring for 30 minutes, followed by stirring at 40 degrees Celsius for 12 hours. Then, the resultant solution was cooled to room temperature (25 degrees Celsius), to remove the solvent. The residue was purified by silica gel column chromatography using methylene chloride as an eluent, to obtain monomer RM-1 having a structure expressed by the following Structural Formula (5) (23.20 g).

Structural Formula (5)

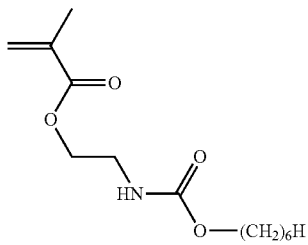

A copolymer (4.82 g) (weight average molecular weight (Mw): 9,000, number average molecular weight (Mn): 4,500) was obtained in the same manner as in Example 1 except that the monomer M-1 of Example 1 was changed to the monomer RM-1.

Next, the aforementioned copolymer was used to prepare aqueous solution of comparative copolymer RCP-1 in the same manner as in Example 21. That is, comparative pigment dispersing element RPD-1 was obtained in the same manner as in Example 21 except that the copolymer CP-1 used in the preparation of pigment dispersing element of Example 21 was changed to the comparative copolymer RCP-1.

Next, comparative aqueous ink RGJ-1 was obtained in the same manner as in Example 21 except that the pigment dispersing element PD-1 used for preparing the aqueous ink of Example 21 was changed to the comparative pigment dispersing element RPD-1.

Comparative Example 2; Preparation of Comparative Aqueous Ink RGJ-2

Comparative pigment dispersing element RPD-2 was obtained in the same manner as in Example 31 except that the copolymer CP-1 used in the preparation of pigment dispersing element of Example 31 was changed to the comparative copolymer RCP-1.

Next, comparative aqueous ink RGJ-2 was obtained in the same manner as in Example 31 except that the pigment dispersing element PD-11 used in the preparation of the aqueous ink of Example 31 was changed to the comparative pigment dispersing element RPD-2.

Comparative Example 3; Preparation of Comparative Aqueous Ink RGJ-3

Comparative pigment dispersing element RPD-3 was obtained in the same manner as in Example 32 except that the copolymer CP-1 used in the preparation of Example 32 was changed to the comparative copolymer RCP-1.

Next, comparative aqueous ink RGJ-3 was obtained in the same manner as in Example 32 except that the pigment dispersing element PD-12 used in the preparation of the aqueous ink of Example 32 was changed to the comparative pigment dispersing element RPD-3.

Comparative Example 4; Preparation of Comparative Aqueous Ink RGJ-4

Comparative pigment dispersing element RPD-4 was obtained in the same manner as in Example 33 except that the copolymer CP-1 used in the preparation of pigment dispersing element of Example 33 was changed to the comparative copolymer RCP-1.

Next, comparative aqueous ink RGJ-4 was obtained in the same manner as in Example 33 except that the pigment dispersing element PD-13 used in the preparation of the aqueous ink of Example 33 was changed to the comparative pigment dispersing element RPD-4.

Comparative Example 5; Preparation of Comparative Aqueous Ink RGJ-5

(Synthesis of Comparative Copolymer RCP-2)

First, 80 g of 2-phenoxyethyl methacrylate as a monomer, 3.7 g of 3-mercapto-1-propanol as a chain transfer agent, and 0.3 g of 2,2-azobis(2,4-dimethyl valeronitrile) as an initiator were dissolved in 160 mL of tetrahydrofuran (THF). Under a nitrogen atmosphere, the resultant solution was heated to 65 degrees Celsius, and was allowed to react for 7 hours. The obtained solution was left to stand, 80 mg of dibutyltin dilaurate (IV) and catalytic amounts of hydroquinone were added thereto, and then 10.0 g of 2-methacryloyloxyethyl isocyanate was added dropwise thereto. The resultant solution was heated to 50 degrees Celsius, and was allowed to react for 2.5 hours. Then, the resultant solution was purified through reprecipitation with a mixture solvent of methanol and water, to obtain 71 g of macromonomer MM-1 (weight average molecular weight (Mw): 4,000, number average molecular weight (Mn): 1,900).

Next, 20 g of methyl ethyl ketone was heated to 75 degrees Celsius under an nitrogen atmosphere. Then, to the aforementioned mixture, a solution obtained by dissolving 1.16 g of dimethyl 2,2'-azobis isobutyrate, 9 g of the macromonomer MM-1 obtained above, 1.8 g of p-stylene sulfonic acid, and 49.2 g of methyl methacrylate in 40 g of methyl ethyl ketone was added dropwise for 3 hours. After completion of dropping, the resultant mixture was further allowed to react for 1 hour, a solution obtained by dissolving 0.2 g of dimethyl 2,2'-azobis isobutyrate in 0.6 g of methyl ethyl ketone was added thereto, and the obtained reaction solution was heated to 80 degrees Celsius, followed by heating and mixing for 4 hours. Moreover, a solution obtained by dissolving 0.2 g of dimethyl 2,2'-azobis isobutyrate in 0.6 g of methyl ethyl ketone was added thereto, followed by heating and stirring for 6 hours. After cooling, the obtained solution was charged into hexane, the thus-precipitated graft polymer was filtrated and dried, to obtain comparative copolymer RCP-2.

(Preparation of Comparative Pigment Dispersing Element RPD-5 and Comparative Aqueous Ink RGJ-5)

Next, comparative pigment dispersing element RPD-5 was obtained in the same manner as in Example 21 except that the copolymer CP-1 used in the preparation of the pigment dispersing element of Example 21 was changed to the comparative copolymer RCP-2.

Next, comparative aqueous ink RGJ-5 was obtained in the same manner as in Example 21 except that the pigment dispersing element PD-1 used in the preparation of the aqueous ink of Example 21 was changed to the comparative pigment dispersing element RPD-5.

Comparative Example 6: Preparation of Comparative Aqueous Ink RGJ-6

(Synthesis of Comparative Copolymer RCP-3)

Comparative copolymer RCP-3 (solid content concentration: 30%) was obtained in the same manner as in Example 12 except that the monomer M-1 used in Example 12 was changed to the monomer RM-1.

(Preparation of Comparative Aqueous Ink RGJ-6)

Aqueous solution 2 was prepared in the same manner as in Example 35. Then, 22.50 parts of the cyan pigment dispersing element CB-C (solid content concentration: 20.0%) prepared in Example 35 was added to the aqueous solution 2, the resultant solution was stirred for 30 minutes, and then 6.67 parts of the comparative copolymer RCP-3 (solid content concentration: 30%) was added thereto, followed by stirring for 30 minutes.

Then, the resultant solution was filtrated through a membrane filter having a pore diameter of 1.2 micro meters, to obtain comparative aqueous ink RGJ-6.

Comparative Example 7; Preparation of Comparative Aqueous Ink RGJ-7

Aqueous solution 1 was prepared in the same manner as in Example 36. Then, 37.50 parts of the magenta pigment dispersing element CB-M (solid content concentration: 20.0%) prepared in Example 36 was added to the aqueous solution 1, and the resultant solution was stirred for 30 minutes. Then, 6.67 parts of the comparative copolymer RCP-3 (solid content concentration: 30%) was added thereto, followed by stirring for 30 minutes. Then, the resultant solution was filtrated through a membrane filter having a pore diameter of 1.2 micro meters, to obtain comparative aqueous ink RGJ-7.

Comparative Example 8; Preparation of Comparative Aqueous Ink RGJ-8

Comparative aqueous ink RGJ-8 was obtained in the same manner as in Example 37 except that the cyan pigment dispersing element PD-11 used for preparing the aqueous ink of Example 37 was changed to the comparative pigment dispersing element RPD-2 (i.e., dispersion element formed of the comparative copolymer RCP-1), and that the copolymer CP-12 was changed to the comparative copolymer RCP-3.

Properties of pigment dispersing elements and aqueous inks prepared in the above Examples and Comparative Examples were measured based on the following methods.

Results of the pigment dispersing elements are summarized and given in Table 3. Results of the aqueous inks are summarized and given in Tables 4 and 5.

<Storage Stability of Pigment Dispersing Element>

Each of the pigment dispersing elements (5.5 g) was loaded to a 30 mL-glass container, followed by storage at 70 degrees Celsius for two weeks. A change of the viscosity of the pigment dispersing element after storage to the viscosity of the pigment dispersing element before storage was determined according to the following formula, and was evaluated based on the following criteria.

Change of the viscosity (%)=(viscosity of pigment dispersing element after storage/viscosity of pigment dispersing element before storage)×100

A viscometer (RE80L, product of Toki Sangyo Co., Ltd) was used to measure a viscosity of the pigment dispersing element at 25 degrees Celsius at the number of rotations of 50 rpm.

<Evaluation Criteria>

A: A change of viscosity is in a range of from minus 5% through plus 5%.

B: A change of viscosity is minus 8% or more but less than minus 5%, or more than plus 5% but plus 8% or less.

C: A change of viscosity is minus 10% or more but less than minus 8%, or more than plus 8% but plus 10% or less.

D: A change of viscosity is minus 30% or more but less than minus 10%, or more than plus 10% but plus 30% or less.

E: A change of viscosity is more than minus 30%, or more than plus 30% (the pigment dispersing element cannot be evaluated because of gelation).

<Storage Stability of Ink>

Each of the inks was filled in the ink cartridge, and was stored at 70 degrees Celsius for one week.

A change of the viscosity of the ink after storage to the viscosity of the ink before storage was determined according to the following formula, and was evaluated based on the following criteria.

Change of the viscosity (%)=(viscosity of ink after storage/viscosity of ink before storage)×100

A viscometer (RE80L, product of Toki Sangyo Co., Ltd) was used to measure a viscosity of the ink at 25 degrees Celsius at the number of rotations of 50 rpm.

<Evaluation Criteria>

A: A change of viscosity is in a range of from minus 5% through plus 5%.

B: A change of viscosity is minus 8% or more but less than minus 5%, or more than plus 5% but plus 8% or less.

C: A change of viscosity is minus 10% or more but less than minus 8%, or more than plus 8% but plus 10% or less.

D: A change of viscosity is minus 30% or more but less than minus 10%, or more than plus 10% but plus 30% or less.

E: A change of viscosity is more than minus 30%, or more than plus 30% (the pigment dispersing element cannot be evaluated because of gelation).

<Image Density>

Each of the inks was filled in an ink jet printer (product of Ricoh Company, Ltd., IPSIO GX5000) in an environment of 23 degrees Celsius and 50% RH. A chart including a 64-point general symbol according to JIS X 0208 (1997), 2223 using Microsoft Word 2000 (product of Microsoft) was printed on plain paper 1 (XEROX4200, product of XEROX) and plain paper 2 (MYPAPER, product of Ricoh Company, Ltd.). Each of the colors of the general symbols printed on the surface of the paper was measured by X-RITE 938 (product of X-Rite), and the results were evaluated based on the following evaluation criteria.

Note that, a printing mode of the inkjet printer was set to "No Color-Correction" obtained by modifying "Plain Paper-Normal High Speed" by using a printer driver attached to the printer by a user setting of plain paper.

Note that, the general symbol according to JIS X 0208 (1997), 2223 is a square shaped symbol inside of which is entirely painted with an ink.

<Evaluation Criteria>

A: 1.25 or more

B: 1.20 or more but less than 1.25

C: 1.10 or more but less than 1.20

D: Less than 1.10

E: Pigment is not dispersed in the ink and an image is not printed because the pigment forms gel.

<Beading>

As a recording medium, a printing paper Lumi Art Gloss 90GSM (registered trademark) (product of Stora Enso) was used to print a general symbol of JIS X 0208 (1997), 2223, in the same manner as in the measurement of the image density except that the printing mode was changed to "Gloss Paper-High Speed". Then, the printed image was evaluated based on the following criteria.

<Evaluation Criteria>

A: Beading does not occur at all, or beading occurs in less than 10% of the total image.

B: Beading occurs in 10% or more but less than 20% of the total image

C: Beading occurs in 20% or more but less than 40% of the total image.

D: Beading occurs in 40% or more but less than 90% of the total image.

E: Beading occurs in 90% or more of the total image.

F: Printing cannot be performed because pigment forms gel and is not dispersed in the ink.

TABLE 3

| | Pigment dispersion element | Copolymer | Colorant | Storage stability of pigment dispersion element |
|---|---|---|---|---|
| Example 21 | PD-1 | CP-1 | Carbon black | A |
| Example 22 | PD-2 | CP-2 | Carbon black | A |
| Example 23 | PD-3 | CP-3 | Carbon black | A |
| Example 24 | PD-4 | CP-4 | Carbon black | A |
| Example 25 | PD-5 | CP-5 | Carbon black | A |
| Example 26 | PD-6 | CP-6 | Carbon black | B |
| Example 27 | PD-7 | CP-7 | Carbon black | A |
| Example 28 | PD-8 | CP-8 | Carbon black | B |
| Example 29 | PD-9 | CP-9 | Carbon black | B |
| Example 30 | PD-10 | CP-10 | Carbon black | A |
| Example 31 | PD-11 | CP-1 | Cyan pigment | A |
| Example 32 | PD-12 | CP-1 | Magenta pigment | A |
| Example 33 | PD-13 | CP-1 | Yellow pigment | A |
| Comparative Example 1 | RPD-1 | RCP-1 | Carbon black | C |
| Comparative Example 2 | RPD-2 | RCP-1 | Cyan pigment | C |
| Comparative Example 3 | RPD-3 | RCP-1 | Magenta pigment | C |
| Comparative Example 4 | RPD-4 | RCP-1 | Yellow pigment | C |
| Comparative Example 5 | RPD-5 | RCP-2 | Carbon black | C |

TABLE 4

| | Ink | Pigment dispersion element | Co-polymer | Usage | Colorant |
|---|---|---|---|---|---|
| Example 21 | GJ-1 | PD-1 | CP-1 | Pigment dispersion | Carbon black |
| Example 22 | GJ-2 | PD-2 | CP-2 | Pigment dispersion | Carbon black |
| Example 23 | GJ-3 | PD-3 | CP-3 | Pigment dispersion | Carbon black |
| Example 24 | GJ-4 | PD-4 | CP-4 | Pigment dispersion | Carbon black |
| Example 25 | GJ-5 | PD-5 | CP-5 | Pigment dispersion | Carbon black |
| Example 26 | GJ-6 | PD-6 | CP-6 | Pigment dispersion | Carbon black |
| Example 27 | GJ-7 | PD-7 | CP-7 | Pigment dispersion | Carbon black |
| Example 28 | GJ-8 | PD-8 | CP-8 | Pigment dispersion | Carbon black |
| Example 29 | GJ-9 | PD-9 | CP-9 | Pigment dispersion | Carbon black |
| Example 30 | GJ-10 | PD-10 | CP-10 | Pigment dispersion | Carbon black |
| Example 31 | GJ-11 | PD-11 | CP-1 | Pigment dispersion | Cyan pigment |
| Example 32 | GJ-12 | PD-12 | CP-1 | Pigment dispersion | Magenta pigment |
| Example 33 | GJ-13 | PD-13 | CP-1 | Pigment dispersion | Yellow pigment |
| Example 34 | GJ-14 | CB-K | CP-11 | Addition | Carbon black |
| Example 35 | GJ-15 | CB-C | CP-12 | Addition | Cyan pigment |
| Example 36 | GJ-16 | CB-M | CP-12 | Addition | Magenta pigment |
| Example 37 | GJ-17 | PD-11 | CP-1 + 12 | Pigment dispersion, addition | Cyan pigment |
| Comparative Example 1 | RGJ-1 | RPD-1 | RCP-1 | Pigment dispersion | Carbon black |
| Comparative Example 2 | RGJ-2 | RPD-2 | RCP-1 | Pigment dispersion | Cyan pigment |
| Comparative Example 3 | RGJ-3 | RPD-3 | RCP-1 | Pigment dispersion | Magenta pigment |
| Comparative Example 4 | RGJ-4 | RPD-4 | RCP-1 | Pigment dispersion | Yellow pigment |
| Comparative Example 5 | RGJ-5 | RPD-5 | RCP-2 | Pigment dispersion | Carbon black |
| Comparative Example 6 | RGJ-6 | CB-C | RCP-3 | Addition | Cyan pigment |
| Comparative Example 7 | RGJ-7 | CB-M | RCP-3 | Addition | Magenta pigment |
| Comparative Example 8 | RGJ-8 | RPD-2 | RCP-1 + 3 | Pigment dispersion, addition | Cyan pigment |

TABLE 5

| | Storage stability of ink | Image density Plain paper 1 | Image density Plain paper 2 | Beading |
|---|---|---|---|---|
| Example 21 | A | A | A | A |
| Example 22 | A | A | A | A |
| Example 23 | A | A | A | A |
| Example 24 | A | A | A | A |
| Example 25 | A | A | A | A |
| Example 26 | B | A | A | A |
| Example 27 | A | A | A | A |
| Example 28 | C | A | A | A |
| Example 29 | C | A | A | A |
| Example 30 | B | A | A | A |
| Example 31 | A | A | A | A |
| Example 32 | A | A | A | C |
| Example 33 | A | A | A | B |
| Example 34 | A | A | A | A |
| Example 35 | A | A | A | A |
| Example 36 | B | A | A | A |
| Example 37 | A | A | A | A |
| Comparative Example 1 | D | C | D | B |
| Comparative Example 2 | D | D | D | D |
| Comparative Example 3 | D | D | D | D |
| Comparative Example 4 | D | D | D | D |
| Comparative Example 5 | E | C | D | F |
| Comparative Example 6 | D | C | C | C |

TABLE 5-continued

| | Storage stability of ink | Image density Plain paper 1 | Image density Plain paper 2 | Beading |
|---|---|---|---|---|
| Comparative Example 7 | D | C | C | C |
| Comparative Example 8 | E | D | D | F |

In the results in Tables 3 to 5, the pigment dispersing elements prepared using the copolymer containing the naphthyl group at the end of the side chain of the polymer described in Examples 21 to 33 are excellent in storage stability compared to the pigment dispersing elements prepared using the copolymer containing no naphthyl group at the end of the side chain of the polymer described in Comparative Examples 1 to 5. As this reason, it is thought that the π-π interaction between the naphthyl group of the copolymer and the pigment improves ability to adsorb the pigment.

Moreover, compared to the ink prepared using the dispersion element that contains the copolymer containing no naphthyl group at the end of the side chain to be adsorbed, the ink prepared using the dispersion element that contains the copolymer containing the naphthyl group at the end of the side chain of the polymer described in Examples 21 to 33, and Example 37 exhibited higher storage stability, and further exhibited excellence in image density and beading.

Each of the inks prepared by adding the emulsion that contains copolymer containing the naphthyl group at the end of the side chain of the polymer described in Examples 34 to 37 is particularly excellent in terms of beading compared to each of the ink prepared by adding the emulsion that contains the copolymer containing no naphthyl group at the end of the side chain of the polymer described in Comparative Examples 6 to 8. As this reason, it is thought that the π-π interaction between the naphthyl group present in the emulsion and the pigment in the ink caused rapid aggregation on the surface of the recording medium during printing, which can prevent occurrence of beading.

Aspects of the present invention are, for example, as follows.

<1> A copolymer including:

a structural unit represented by the following General Formula (1);

a structural unit expressed by the following Structural Formula (1); and a structural unit represented by the following General Formula (2), (Chem. 19)

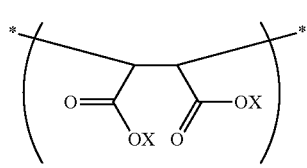

General Formula (1)

where in the General Formula (1), X represents a hydrogen atom or a cation, (Chem. 20)

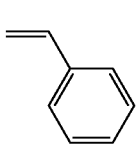

Structural Formula (1)

(Chem. 21)

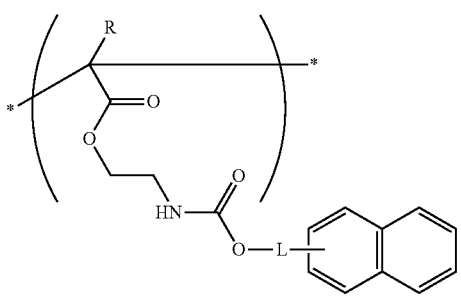

General Formula (2)

where in the General Formula (2), R is a hydrogen atom or a methyl group, L is a single bond or —(CH$_2$)$_n$—O—CO— where n is an integer in a range of from 2 through 18, and a carbonyl carbon atom in the —(CH$_2$)$_n$—O—CO— is bound to naphthyl.

<2> The copolymer according to <1>, wherein an amount of the structural unit represented by the following General Formula (2) in the copolymer is in a range of from 20 mol % through 80 mol %.

<3> The copolymer according to <1> or <2>, wherein the copolymer is formed through polymerization of a compound represented by the following General Formula (3), a compound expressed by the following Structural Formula (2), and a compound represented by the following General Formula (4), (Chem. 22)

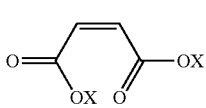

General Formula (3)

where in the General Formula (3), X is a hydrogen atom or a cation, (Chem. 23)

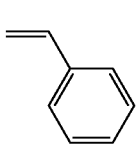

Structural Formula (2)

-continued (Chem. 24)

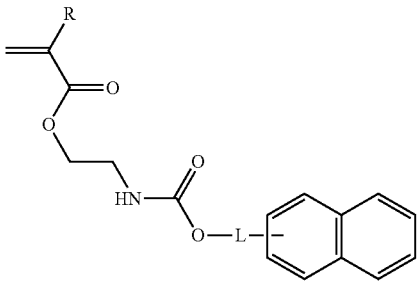

General Formula (4)

where in the General Formula (4), R is a hydrogen atom or a methyl group, L is a single bond or —$(CH_2)_n$—O—CO— where n is an integer in a range of from 2 through 18, and a carbonyl carbon atom in the —$(CH_2)_n$—O—CO— is bound to naphthyl.

<4> The copolymer according to any one of <1> to <3>, wherein the copolymer is used as a binder resin or a pigment dispersion agent of the aqueous ink.

<5> An aqueous ink including:
water;
a colorant; and
a copolymer,
wherein the copolymer is the copolymer according to any one of <1> to <4>.

<6> The aqueous ink according to <5>, wherein the colorant includes a pigment.

<7> The aqueous ink according to <5> or <6>, further including at least one selected from the group consisting of water-soluble organic solvents and surfactants.

<8> An ink cartridge including:
a container; and
the aqueous ink according to any one of <5> to <7> stored in the container.

<9> An inkjet recording device including:
an ink jetting unit configured to apply a stimulus to the aqueous ink according to any one of <5> to <7> to jet the aqueous ink and record an image on a recording medium.

<10> An inkjet recording method including:
applying a stimulus to the aqueous ink according to any one of <5> to <7> to jet the aqueous ink and record an image on a recording medium.

<11> A recorded matter including:
an image recorded by the aqueous ink according to any one of <5> to <7>.

The copolymer according to any one of <1> to <4>, the aqueous ink according to any one of <5> to <7>, the ink cartridge according to <8>, the inkjet recording device according to <9>, the inkjet recording method according to <10>, and the recorded matter according to <11> can resolve the conventional problems and can achieve an object of the present invention.

REFERENCE SIGNS LIST

200 ink cartridge
241 ink bag
242 ink inlet
243 ink outlet
244 cartridge case

The invention claimed is:
1. A copolymer comprising:
   a structural unit represented by the following General Formula (1);
   a structural unit expressed by the following Structural Formula (1); and
   a structural unit represented by the following General Formula (2),

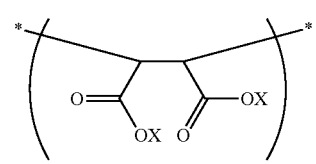

General Formula (1)

wherein in the General Formula (1), X represents a hydrogen atom or a cation,

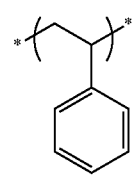

Structural Formula (1)

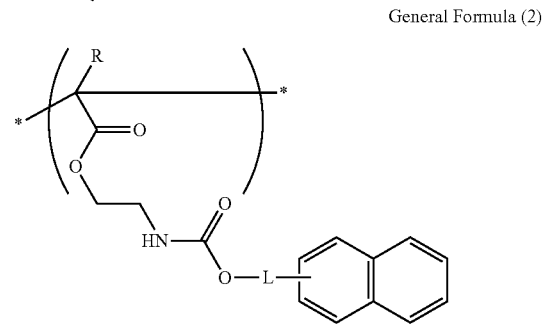

General Formula (2)

wherein in the General Formula (2), R is a hydrogen atom or a methyl group, L is a single bond or —$(CH_2)_n$—O—CO— where n is an integer in a range of from 2 through 18, and a carbonyl carbon atom in the —$(CH_2)_n$—O—CO— is bound to naphthyl.

2. The copolymer according to claim 1, wherein an amount of the structural unit represented by the General Formula (2) in the copolymer is in a range of from 20 mol % through 80 mol %.

3. The copolymer according to claim 1, wherein the copolymer is formed through polymerization of a compound represented by the following General Formula (3), a compound expressed by the following Structural Formula (2), and a compound represented by the following General Formula (4),

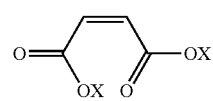

General Formula (3)

wherein in the General Formula (3), X is a hydrogen atom or a cation,

Structural Formula (2)

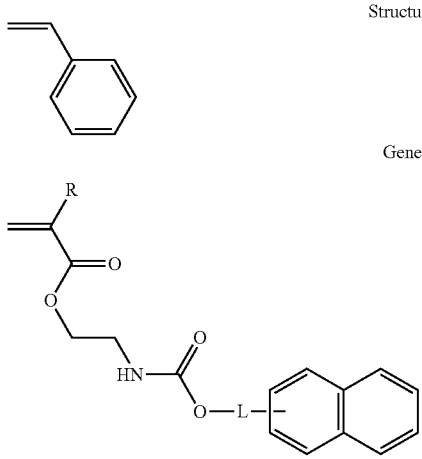

General Formula (4)

wherein in the General Formula (4), R is a hydrogen atom or a methyl group, L is a single bond or —(CH$_2$)$_n$—O—CO— where n is an integer in a range of from 2 through 18, and a carbonyl carbon atom in the —(CH$_2$)$_n$—O—CO— is bound to naphthyl.

4. An aqueous ink comprising:
water;
a colorant; and
a copolymer,
wherein the copolymer is the copolymer according to claim 1.

5. The aqueous ink according to claim 4, wherein the colorant comprises a pigment.

6. The aqueous ink according to claim 4, further comprising at least one selected from the group consisting of water-soluble organic solvents and surfactants.

7. An ink cartridge comprising:
a container; and
the aqueous ink according to claim 4 stored in the container.

8. An inkjet recording device comprising:
an ink jetting unit configured to apply a stimulus to an aqueous ink to jet the aqueous ink and record an image on a recording medium,
wherein the aqueous ink comprises:
water;
a colorant; and
a copolymer,
and wherein the copolymer is a copolymer comprising:
a structural unit represented by the following General Formula (1);
a structural unit expressed by the following Structural Formula (1); and
a structural unit represented by the following General Formula (2),

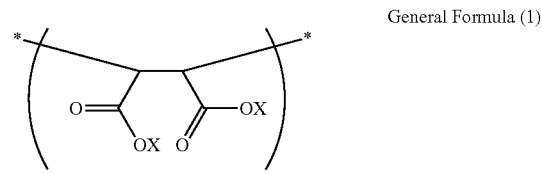

General Formula (1)

wherein in the General Formula (1), X represents a hydrogen atom or a cation,

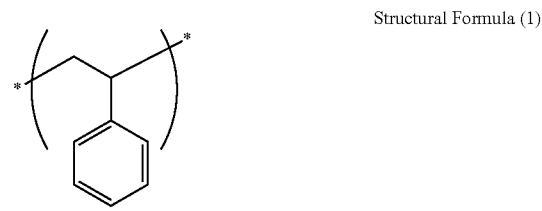

Structural Formula (1)

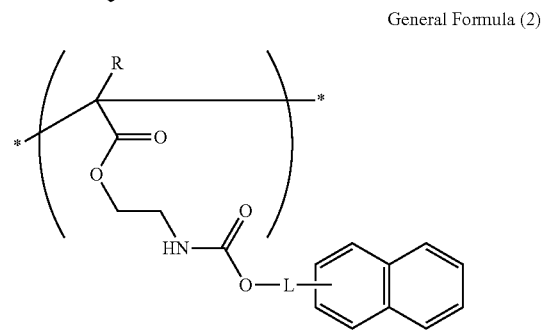

General Formula (2)

wherein in the General Formula (2), R is a hydrogen atom or a methyl group, L is a single bond or —(CH$_2$)$_n$—O—CO— where n is an integer in a range of from 2 through 18, and a carbonyl carbon atom in the —(CH$_2$)$_n$—O—CO— is bound to naphthyl.

9. An inkjet recording method comprising:
applying a stimulus to the aqueous ink according to claim 4 to jet the aqueous ink and record an image on a recording medium.

10. A recorded matter comprising:
an image recorded by the aqueous ink according to claim 4.

* * * * *